United States Patent
McIntyre

(10) Patent No.: US 10,346,497 B1
(45) Date of Patent: Jul. 9, 2019

(54) SYSTEM AND METHOD FOR COLLECTING AND TRACKING EVIDENCE

(71) Applicant: Primary Marking Systems, Inc., St. Peters, MO (US)

(72) Inventor: Timothy J. McIntyre, Lake St. Louis, MO (US)

(73) Assignee: Primary Marking Systems, Inc., St. Peters (*) Notice: Subject to any disclaimer, the term of this patent is extended or adjusted under 35 U.S.C. 154(b) by 10 days.

(21) Appl. No.: 15/477,082

(22) Filed: Apr. 1, 2017

Related U.S. Application Data

(63) Continuation of application No. 14/679,407, filed on Apr. 6, 2015, now Pat. No. 9,619,851, which is a
(Continued)

(51) Int. Cl.
  *G06F 16/955* (2019.01)
  *G06F 16/58* (2019.01)
  (Continued)

(52) U.S. Cl.
  CPC ...... *G06F 16/9554* (2019.01); *G06F 16/5866* (2019.01); *G06K 19/06028* (2013.01);
  (Continued)

(58) Field of Classification Search
  CPC ........ G06F 17/30879; G06F 17/30268; G06K 19/0725; G06K 19/06028; G06Q 10/063;
  (Continued)

(56) References Cited

U.S. PATENT DOCUMENTS 5,025,920 A   6/1991   Walsh
5,635,917 A   6/1997   Todman
(Continued)

OTHER PUBLICATIONS

Scheck, Anne, Rape Kit Allows Anonymous Collection of Evidence [online], Emergency Medicine News, Dec. 2008, vol. 30, Issue 12, p. 1, 39 [retrieved on Mar. 25, 2017]. Retrieved from the internet <URL: http://journals.lww.com/em-news/Fulltext/2008/12000/Rape_Kit_Allows_Anonymous_Collection_of_Evidence.2.aspx>.

*Primary Examiner* — Laura A Gudorf
(74) *Attorney, Agent, or Firm* — Creativenture Law, LLC; Dennis J M Donahue, III; Kevin C. Staed

(57) ABSTRACT

A system and method for tagging, organizing and tracking evidence during an investigation has evidence kits and mobile communication devices that collect physical, photographic and interpretive evidence, such as materials from a crime scene, interviews with witnesses and an establishing shot of the crime scene or other areas or persons of interest for surveillance operations. The evidence kits can be used to collect physical evidence, and the mobile devices or other computers are used to upload information about the evidence. Users can enter descriptive information about the evidence into the mobile devices while other information pertaining to the evidence may be obtained from other sources and automatically provided to the users for their review and possible incorporation into the record. Each mobile device can store information in memory and communicate the information to the central server computer where it may then be made available to groups of mobile device users.

17 Claims, 31 Drawing Sheets

Related U.S. Application Data continuation-in-part of application No. 13/598,608, filed on Aug. 29, 2012, now Pat. No. 8,998,084, which is a continuation-in-part of application No. 12/839,213, filed on Jul. 19, 2010, now Pat. No. 8,998,083, which is a continuation-in-part of application No. 12/751,846, filed on Mar. 31, 2010, now Pat. No. 8,220,711.

(60) Provisional application No. 61/226,544, filed on Jul. 17, 2009.

(51) Int. Cl.
| | | |
|---|---|---|
| *G06K 19/07* | (2006.01) | |
| *G06Q 10/08* | (2012.01) | |
| *H04N 5/232* | (2006.01) | |
| *G06K 19/06* | (2006.01) | |
| *G06Q 10/06* | (2012.01) | |
| *G06Q 50/26* | (2012.01) | |

(52) U.S. Cl.
CPC ....... *G06K 19/0725* (2013.01); *G06Q 10/063* (2013.01); *G06Q 10/087* (2013.01); *G06Q 50/26* (2013.01); *H04N 5/23222* (2013.01); *H04N 5/23293* (2013.01)

(58) Field of Classification Search
CPC .. G06Q 10/087; G06Q 50/26; H04N 5/23222; H04N 5/23293
See application file for complete search history.

(56) References Cited

U.S. PATENT DOCUMENTS

| | | | |
|---|---|---|---|
| 6,538,623 B1 * | 3/2003 | Parnian | G06F 1/163 224/908 |
| 7,466,244 B2 | 12/2008 | Kimchi | |
| 7,510,080 B2 | 3/2009 | Smart | |
| 2002/0113707 A1 | 8/2002 | Grunes | |
| 2004/0212480 A1 * | 10/2004 | Carrender | G06K 7/0008 340/10.42 |
| 2004/0260733 A1 | 12/2004 | Adelstein | |
| 2005/0187733 A1 | 8/2005 | Staab | |
| 2007/0299364 A1 | 12/2007 | Sangha | |
| 2008/0217391 A1 | 9/2008 | Roof | |
| 2009/0268989 A1 * | 10/2009 | Berland | B65D 33/1675 383/5 |
| 2010/0265068 A1 * | 10/2010 | Brackmann | B60P 3/03 340/572.1 |
| 2010/0305992 A1 | 12/2010 | Michalzuk | |

* cited by examiner

Victims

- First Name: Diane
- Middle Name: Susan
- Last Name: Miller
- Alias / Entity:
- DoB: 04/22/1972
- Sex: F
- [Take Picture]
- [Delete Picture]

Main | Location
Cancel | Save

FIG. 7B

Victims

- Street: 2240 Harrington Drive
- Apt:
- City: Chicago
- State: IL
- Zip: 60607
- Phone: 847-555-5555
- Notes: Victim taken to Cook Country hospital for head injury treatment Main | Location
Cancel | Save

FIG. 12

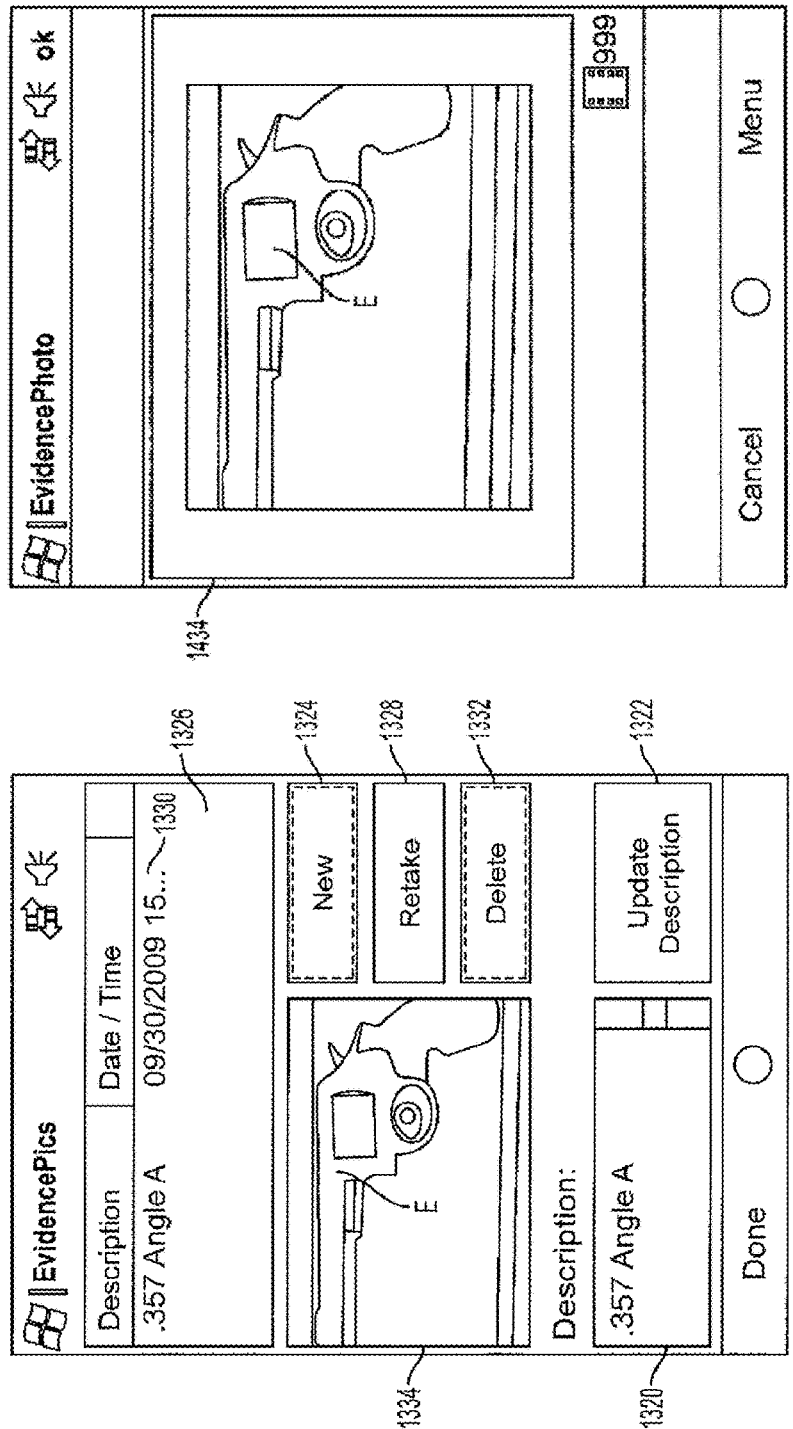

⚠ Alerts

| Alert Date | Evidence Barcode | Alert DSN | Alert Text |
|---|---|---|---|
| 06/17/2010 18:58:27 | 00001 | 1234 | Dispose of this Evidence: |

2701

Mark Completed — 2703

● Next Logon
○ After: 06/17/2010 17:00:02 ▼

↻ Remind — 2705

FIG. 27

| Barcode | Trans# | DSN | From | To | Unit | Unit Desc | Qty | Modified |
|---|---|---|---|---|---|---|---|---|
| 007BJB | 15 | Roger | Roger | | Total | Seized | All | 2011-05-29 14:44:18 |
| 1234567890 | 14 | 1234 | 1234 | | Total | Seized | All | 2011-05-16 09:01:25 |
| 25946 | 23 | ROGER | ROGER | | Total | Seized | All | 2011-07-29 15:55:47 |
| 25947 | 16 | USER | USER | | Total | Seized | All | 2011-08-16 10:37:14 |
| 25948 | 28 | ADVUSER | + | ADVUSER | Total | Handoff | All | 2011-08-24 11:29:15 |
| 28619 | 25 | ROGER | Tim | Roger | CountItem | Box of Evidence | 1 | 2011-08-12 15:56:15 |
| 5678 | 26 | ROGER | Tim | Roger | Currency\US\Paper($100) | Wet | 1 | 2011-08-12 15:57:01 |
| Roger Long Desc | 29 | ADVUSER | + | PJ | Measurement\Ounces | Drugs | 40 | 2011-08-24 12:05:22 |
| Roger Long Desc | 27 | ADVUSER | + | ADVUSER | Total | Handoff | All | 2011-08-24 11:18:25 |
| Roger Long Desc | 24 | ROGER | + | ROGER | Total | Handoff | All | 2011-08-12 15:17:19 |
| Roger Test | 13 | ROGER | ROGER | | Total | Seized | All | 2011-08-25 13:47:16 |

SYSTEM AND METHOD FOR COLLECTING AND TRACKING EVIDENCE

CROSS-REFERENCE TO RELATED APPLICATIONS

This application is a continuation of U.S. patent application Ser. No. 14/679,407 filed on Apr. 6, 2015, issued as U.S. Pat. No. 9,619,851, which is a continuation-in-part of U.S. patent application Ser. No. 13/598,608 filed on Aug. 29, 2012, issued as U.S. Pat. No. 8,998,084, which is a continuation-in-part of U.S. patent application Ser. No. 12/839,213 filed on Jul. 19, 2010, issued as U.S. Pat. No. 8,998,083, which is a continuation-in-part of U.S. patent application Ser. No. 12/751,846 filed on Mar. 31, 2010, issued as U.S. Pat. No. 8,220,711, and claims the benefit of U.S. Provisional Pat. App. Ser. No. 61/226,544 filed on Jul. 17, 2009. The entire disclosure of these related applications is herein incorporated by reference.

STATEMENT REGARDING FEDERALLY SPONSORED RESEARCH

Not Applicable.

APPENDIX

Not Applicable.

BACKGROUND OF THE INVENTION

Field of the Invention

This disclosure relates to the field of systems and methods for the electronic tracking of valuable objects and information. Specifically, the disclosure relates to the physical and electronic collecting, tagging, organizing and tracking of evidence and other information related to police or other investigative work for later use in law enforcement, judicial proceedings or military operations.

Related Art

In the United States and many other justice systems, judges, juries, and others involved in the judicial system rely on evidence presented at a trial, mediation, arbitration, or other formal proceeding to make a determination as to guilt, innocence, liability, and other legal findings. Because of its importance to such proceedings, there has arisen an entire body of law devoted to nothing except a determination of what may be used as evidence, how it may be presented, and what may be inferred from it.

A good number of evidentiary rules exist to attempt to prevent the presentation of false evidence and to make sure that material shown and used at trial is the actual material that is involved in the underlying action. As the evidence is often the basis for a determination, if the underlying evidence is flawed, inaccurate, or presented inaccurately, a bad determination can be made. As should be clear, it is therefore necessary to make sure that rules are followed with regards to the chain of custody of evidence to make sure that what is presented at trial is ultimately the same as what was originally located.

Because of the nature of criminal investigations, it is very important to know that a piece of evidence located at a crime scene is the same piece of evidence tested by a forensics lab and is ultimately the same piece of evidence presented at trial. In a civil case, lapses in the ownership of physical evidence can often be eliminated by testimony. For example, an individual can be placed on a witness stand and requested to indicate whether or not a certain thing is theirs. In a criminal trial, however, such testimony may not be possible as a defendant is not required to take the stand, and may have an increased interest to lie or deceive. Further, in criminal situations, an increased burden of proof can often require a much more exacting standard. Still further, the same type of evidence may not be as important in a civil case. For example, it may be much more important that a rat was found in an apartment, than the same rat is presented at trial.

In a criminal action, there are often a couple of key pieces of physical evidence. For example, one such key piece of evidence may be the gun used in a shooting. However, the gun may not be immediately connectable to the shooting as the action of the shooting has separated the gun from the bullet which is the more direct connection. Even if the gun is located at the scene, the gun is rarely seen by investigators when the shooting is "occurring." It is, therefore, necessary to connect a gun to the bullet, and to who pulled the trigger. This can involve not only the specifics of the gun itself, but where the gun was located (was it on the defendant, at the scene etc.), how it is known that it fired the bullet which hit the victim (e.g. from ballistics analysis), and how it is determined that this defendant pulled the trigger (e.g. from fingerprints, powder residues, etc.).

The specifics of these connections often mean that a gun has to pass through numerous hands after it is collected. Further, in some situations, there may be multiple guns located and it is important to know which one was actually the weapon used to commit this crime. For example, it will generally be necessary to show that a specific firearm was the same one found in a specific place. Further, it also may be necessary to connect that that specific firearm matches the type used in the shooting, that ballistics information for a bullet fired from that firearm matches the ballistics information from a bullet taken from the victim, and that the bullet tested is actually the bullet from the victim. Still further, it is necessary to connect that a fingerprint from the defendant was taken from that same firearm, that a bullet casing found at the scene was used by that firearm, and so on.

It should be apparent that the web of connections can grow very complicated very quickly. Further, this information is generally needed weeks or months after the shooting occurred and the gun was located. Should an incorrect connection be made somewhere in the process of getting from crime to trial, it is possible to introduce a whole slew of errors. Thus, there is a significant chance that if a mistake is made and an inaccurate connection is introduced, the entire web of connection can become flawed. If the gun taken from the scene is correctly identified as that which fired the bullet, but that gun was then inadvertently replaced with a different gun after the connection was made, a later fingerprint analysis of the "new" gun would point to the gun being used by an individual who actually has no connection with the shooting.

To try and deal with this, rigorous authentication methods have traditionally been used to make sure that evidence is gathered, stored, tested, and handled in such a way that the connections of later evidence to the original evidence are all maintained. This is commonly referred to as "chain of custody" and the idea is that definitive links through each person handling the evidence can be made which tend to show that the same piece of evidence made it through the entire evaluation process and no substitutions were made at any point. Further, if a problem is discovered, chain of custody also provides for improved likelihood of identifying where the problem occurred either to catch a purposeful tampering with evidence, to detect a faulty procedure, or even to potentially allow it to be rectified.

As should be apparent from the above, the purpose of chain of custody is to improve the chances that the same evidence is used by each of the multiple individuals that use it and assert that their results are from it. Should a bullet be inaccurately connected to the victim, it is possible that a piece of false evidence will inadvertently be used because that inaccuracy connects the wrong gun, and probably the wrong defendant to that victim. If the bullet from the shooting is mixed up with the bullet from the ballistics test of the confiscated firearm, the conclusion that the gun fired the bullet used becomes automatic as the bullets (which are actually the exact same bullet) clearly "match." At the same time, it should be clear that the conclusion is inherently flawed (and potentially completely wrong) as the proposition became self-supporting that this was the gun used in the crime when indeed no such conclusion can be drawn with any accuracy due to the incorrect connection.

In its simplest form, chain of custody is the documentation of the movement and location of a piece of evidence from the time it is collected until it is finally presented in court. Chain of custody will generally involve a clear indication of the collection of the evidence, how it is stored, when the evidence is placed in different people's control, and how the evidence transfers between individual's control so as to identify any chance of it being tampered with, a mistake being made in its identification, or it is simply being lost.

One can best understand chain of custody by recognizing that a piece of evidence will change hands repeatedly, but the object is only a single thing. Therefore, if it is in a lab under one person's control it cannot simultaneously be elsewhere. Further, if that individual has a unique piece of evidence they will probably return that same piece of evidence. So long as the pathway of that piece of evidence can be tracked, and procedures are in place which inhibit it from getting inaccurately connected to anything else, the odds of a piece of evidence traveling through the system with accurate connections are dramatically increased.

As should be clear from the above, the chain of custody provides for a clearer indication that the same thing is always being referenced. Should the chain be broken, there is a possibility that later evidence is not correctly connected. Should this happen, evidence may be thrown out at trial or may be given reduced weight by a jury attempting to determine the quilt or innocence of the specific defendant. Still further, as a chain of custody indicates who has handled the evidence, should there become concern that evidence has been tampered with, it is possible to recreate who could have done the tampering.

Because of the problems in maintaining the chain of custody in evidence, a large number of materials have arisen to try and make sure that the chain of custody is maintained. In most instances, these materials involve highly manual practices and specialized collection containers to provide for written records of who has handled a piece of evidence. The materials also serve to contain the specific evidence within them so that the individual item is more easily kept tracked and is protected from contamination by an outside source. These systems generally provide ways to uniquely identify a piece of physical evidence. Such systems try and make sure that an individual piece of evidence can be easily and quickly identified as the unique and specific item it is. For the most part, such systems provide for containers into which evidence may be placed, labeling of containers, and identification of individuals who handled (e.g. opened) those containers.

While these systems generally work, they are manually intensive and are subject to concern as the containers can be misplaced, misrecorded, or misidentified through human error. For example, an evidence bag having a unique number allows for specific identification of the evidence bag (and its contents). However, it is possible that when an individual checks out a bag, an inaccurate identifier of the bag is entered by the human user creating a chain of custody concern. Similarly, the contents of the bag may be placed back in the wrong bag leading to inaccuracies.

Still further, while physical evidence is necessary in any investigation, crime scene photos, police officer notes, and other materials also associated with the case and necessary for investigation are not necessarily physical evidence. This information can itself become evidence depending on what occurs during the investigation. These items may have reduced chain of custody issues, but are often not connected at all with the case that they support and when they do become evidence may have increased concerns due to them having been handled differently.

Even with recent improvements in evidence management techniques and automation, such as tagging, organizing, searching and tracking physical evidence and related information, particularly including improvements in the collection of the physical evidence using barcodes and other machine readable codes, such as QR codes and RFID codes, there remains a significant lack of integration between the central repositories of information that are available in central computer systems and the mobile scanners that are used to collect and track evidence. For example, each one of the mobile scanners in U.S. Pat. Nos. 6,947,866, 6,816,075 and US Pub. No. 2010/0305992 can read various types of machine readable codes corresponding with physical evidence and upload the information to the central computer systems, and US Pub. No. 2010/0305992 even indicates that the mobile scanner can be used to enter data indicative of various pieces of evidence at the crime scene, store the data in the mobile scanner, and upload the data to the central computer system. However, the mobile scanners in these known systems do not allow the user to enter critical evidence about suspects, such as vital statistics, nor do they allow the user to perform searches on suspects' vital statistics nor do they allow for searching descriptions of evidence that is already associated with a suspect in the central database.

Even though the evidentiary master records that are stored in these known central computer systems contain information about suspects, victims, witnesses, and other people, and users of the host computer systems have been able to search the vital statistics of such people for decades, this searching functionality is not provided to the users of the mobile scanners. Instead, the mobile scanners are integrated into the host computer systems in these prior art systems primarily for the entry and tracking of physical evidence, but the mobile scanners are not used for entering vital statistic information about people or for searching the evidence records other than the searches using the machine readable codes. For example, the searching of the mobile scanner in US Pub. No. 2010/0305992 is limited to machine readable codes associated with particular evidence items which indicates that the searching capability of the mobile scanner appears to be for the purpose of tracking particular items of physical evidence using the corresponding codes that have been entered into the central repository rather than for any broad searching of the vital statistics or names of people or the descriptions of physical evidence. Instead, in these known systems, the broader searches are performed using the host computer.

This lack of broad searching capability for the mobile scanners in the prior art is indicative of evidence management systems that have been developed for forensic crime scene investigations without interviews with victims, witnesses and other persons of interest. Therefore, there remains a need for a mobile collection device which can perform the role of a mobile scanner for forensic investigations but which can also be used in a way that is needed by first responders to a crime scene or a location of some other emergency. For interpretive evidence, witnesses are interviewed and the investigator or other officer takes notes with pen and paper. The mobile scanners in the references do not provide the investigator with any way to take notes and link them with suspects, victims, witnesses or other persons of interest. The officer may enter some of the basic witness information, such as the witness' name, address and driver's license number into their mobile communication system in their patrol car, and possibly a suspect's name, and they will probably receive back some public record information, including criminal history and driving citations, from a centralized server computer that queries one or more databases. The officer may also call in a description of a suspect that a dispatcher may relay to other officers through their radios and mobile communication systems, but the mobile scanners do not provide the officer with a way to take pictures of suspects, link it with vital statistics and names and upload the information to a central server computer. Additionally, when an officer is interviewing victims and witnesses and time is most critical, the mobile scanners do not allow the officer to enter a suspect's name or vital statistics into their mobile scanner and send the search to the central computer.

In current systems, officers could call in the names and vital statistics of suspects on their radios and may even be able to go back to their vehicles to run searches and see any resulting pictures that may be found in the master record of evidence in the central server computer and other investigatory tools that are networked with the central server computer and the vehicle systems. However, the officers cannot perform these types of searches with their mobile scanners or any other handheld mobile collection device. Instead, the current devices that perform the various investigatory actions are fragmented and operate on systems that many times do not even communicate with each other. In the years following the 9/11 attacks, there were calls for integrating the investigatory tools that are being used by police offers, fire fighters, paramedics and emergency medical personnel, and other first responders. Some back end systems have become more integrated and there have been improvements in the mobile scanners for tracking evidence. However, before this invention, no other handheld computer device had provided first responders and the initial investigating officers with the ability to have a completely integrated mobile system that is in a networked communication with the master record of evidence in the central computer system as well as other investigatory tools.

SUMMARY OF THE INVENTION

Because of these and other reasons, there are described herein systems and methods for providing electronic monitoring of evidence and electronic storage of investigatory materials. Specifically, the systems relate to electronic systems for identifying, storing, and evaluating evidence. The systems utilize a combination of computer readable storage of investigatory material, along with computer storage of evidence identification.

There is described herein, among other things, a system for the tracking of evidence using evidence tags which have a machine readable indicia and a handheld device that has a camera and a memory. The system preferably includes an evidence container, a printer; and a central server computer. The evidence tags are designed to be attached to a piece of evidence at the time of collection in such a fashion as to indicate if said evidence tag is later removed from the evidence. The evidence is stored in the evidence container and can be removed from the evidence container without destroying the evidence container. The handheld device is preferably used to identify various items of evidence using evidence entries that each includes a description and a photograph of the evidence which is stored in the memory. The printer can be used to print an identification label that is attached to the evidence container and identifies the items of evidence in the container and the case associated with the evidence. The evidence entries in the memory of the handheld device are transferred to the central server computer, and the evidence is transferred to a storage facility. The evidentiary photographs can include an establishing shot picture to which the other evidence pictures are referenced. Additionally, the establishing shot picture can be linked to a location that corresponds with at least one of the evidentiary photographs, and the location can be defined by the system as a reference position for the establishing shot relative to the other evidentiary locations so that the system has location references between the establishing shot picture and the other evidentiary photographs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 shows a login screen on a portable computer used in the system.

FIG. 3 shows a case setup screen on the portable computer.

FIG. 4 shows a suspect list screen on the portable computer.

FIG. 6 shows a victim list screen on the portable computer.

FIGS. 7A & 7B show a entry screens for victim data on the portable computer.

FIGS. 10-12 show entry screens for evidence on the portable computer.

FIG. 13 shows a photo entry screen for evidence on the portable computer.

FIG. 14 shows a camera display screen on the portable computer.

FIG. 16A shows a screen with a selection of printing labels for evidence bags.

FIG. 16B shows a screen with a selection of evidence to be placed in a bag.

FIG. 18 shows a case list screen.

FIG. 19 shows an integrated screen with a suspect list and details.

FIG. 20 shows an evidence room screen with a chain of custody record.

FIG. 21 shows a case list on a computer with onsite access to a central server.

FIG. 22 shows an evidence list on the onsite access computer.

FIG. 23 shows a victim list on the onsite access computer.

FIGS. 24A-24F show case information screenshots.

FIG. 25B shows a screenshot of logical operations for searches and filters.

FIG. 26 shows an alert setup screenshot.

FIG. 27 shows an alert notification screenshot.

FIG. 30 is a chain of custody report for evidence entries.\

FIGS. 31A & 31B show screenshots of pictures selected as an establishing shot.

FIGS. 32A-32D shown incident scene mapping screenshots.

DETAILED DESCRIPTION OF THE PREFERRED EMBODIMENTS

The system and methods herein will generally be discussed in conjunction with a collection of hypothetical evidence being collected in a criminal investigation. While the system can be used in conjunction with any type of evidence collection and investigation, a criminal case is used in the examples as it is generally more familiar to the reader and it provides an opportunity to highlight a number of specific types of evidence that could be collected. Accordingly, the following description of the preferred embodiment(s) is merely exemplary in nature and is in no way intended to limit the invention, its application, or uses.

To begin with, it is helpful to provide a common vocabulary for this discussion. Throughout this disclosure, references to "physical evidence" will be to items which are collected during an investigation which item will itself potentially be used in a resultant trial and which item is physically controlled during the investigatory process. Thus, physical evidence can be physically be taken back to a storage facility, stored, and later examined or otherwise further investigated.

"Photographic evidence" will comprise evidence that cannot be physically taken back to a storage facility, but comprises photographs which are taken of the evidence contemporaneously to its discovery. Photographic evidence may be of items which are themselves physical evidence or may comprise things that cannot be taken into physical evidence. This may be because they are transitory in nature or because they are physically difficult to transport. For example, the position of a body is generally not something that can be maintained as physical evidence. Instead, a photograph of the position will generally be made.

"Interpretive evidence" is evidence that is collected by an investigator and relates to their notes, thoughts, observations or other information they collect which is not physical or photographic. In effect, this is evidence that is subject to the interpretation of the investigator. This may comprise their thoughts or feelings, observations, or other material that is subjective to them. As example(s), it may be their comments during an investigation (such as describing a location in a photograph or where it was taken from), personal observations or may be something that they have no way of recording in another fashion. For example, an investigator may record what a witness told them. Interpretative evidence may be used at trial, but is also often used as an investigatory aid.

While the above descriptions are utilized throughout this document, the above are in no way intended to limit the meaning of these terms as they may be understood by one of ordinary skill in the art.

Figure 1:
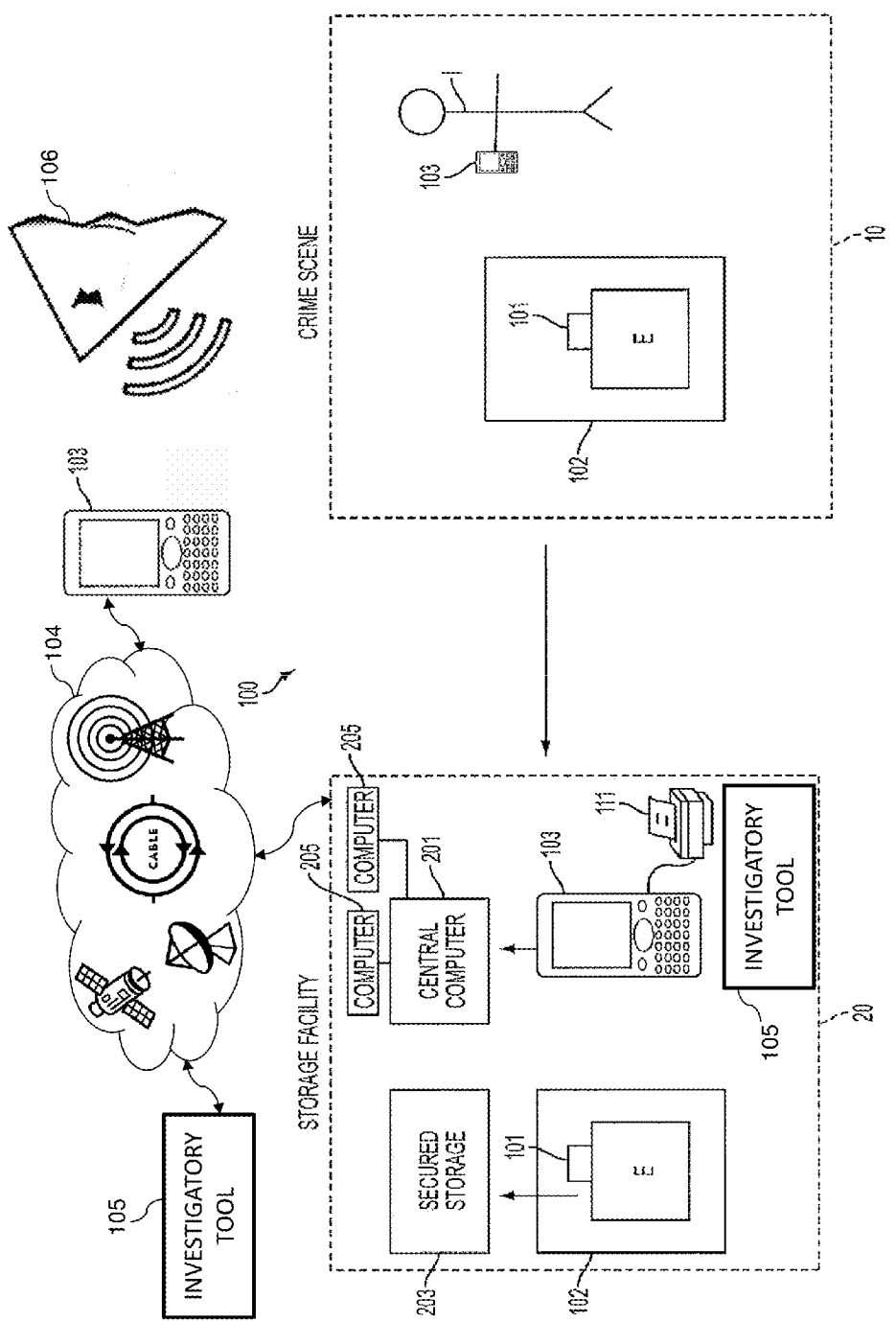
FIG. 1 shows a block diagram of a system for tracking evidence.

FIG. 1 provides a block diagram of the components of an embodiment of an evidence tracking system (100). In FIG. 1 there are provided two different parts of the system. The first is for use at the crime scene (10). At the scene (10) a piece of evidence (E) which will need to be collected, identified, and tracked. The evidence (E) is tagged through the use of a tag (101) which is connected to the evidence (E) directly. The evidence (E) is also tagged by being placed in a bag or other container (102).

The existence and identification of the tagged evidence (E) is entered into handheld computer (103) by an investigator (I). The investigator (I) will also provide additional information into the computer (103) to identify the evidence as well as information about the evidence (E) such as, but not limited to, identification information, photos, or observations. The investigator (I) may also utilize the handheld computer (103) in the collection of additional evidence such as photographic evidence and interpreted evidence which may be connected or unconnected to physical evidence such as, but not limited to, identification of suspects or victims, other notes, or observations. The handheld computer (103) will generally provide for a linking connection associating the tag (101), the evidence (E), the bag (102) and any other information related to the case and store all this information in an internal memory while the investigator (I) is at the crime scene. The computer (103) will generally be capable of communication and may obtain information wirelessly from a remote location, specifically an evidence locker or other secure evidence storage site (20) and may include peripheral devices such as printer (111).

Once the evidence (E) has all been collected, the computer (103) and evidence (E) will jointly be presented to an evidence storage facility (20). The memory of the computer (103) is generally transferred to a generally secured central computer system (201). The evidence (E) may also be placed into secure storage (203) at a related time. This provides for the first check to make sure that the evidence (E) is correctly identified as the information transferred from the computer (103) will need to match with the evidence (E) actually provided.

Evidence (E) can be checked out from the secure storage (203) by parties which need access to it through the use of an onsite access (205) to the central computer system (201).

Checking out the evidence involves obtaining the evidence (E) and having the central system (201) be updated to indicate that the Evidence (E) has been placed in that individual's control. Again, the system (201) will double check to make sure that the correct evidence (E) is checked out. When the evidence (E) is returned, the same checks occur. It is checked that the same individual who checked out the material is returning it and that the evidence (E) matches the records. This process will repeat for every individual who will access the evidence (E). Further, the onsite access (205) may allow for parties to review evidence, collate cases by any number of criteria, and provide for chain of custody information for use at trial to further investigations and provide for simplified evidence (E) handling.

While the above provides for a general indication of the components of the system (100), the system (100) is best understood by discussing the various pieces of the system (100) in conjunction with a hypothetical investigatory activity. For purposes of this disclosure, that activity will be the investigation of an armed crime.

To begin with, it is important to recognize that there are a variety of pieces of information which comprise evidence. As discussed above, evidence can be physical evidence, photographic evidence, and interpretive evidence. One benefit of the depicted embodiment of the system (100) is that it allows for all such evidence (E) to be collected on a single device (103) which can be taken to the crime scene, on later investigations, or otherwise transported with an investigator (I). The device (103) can also provide functionality which further assists in evidence collection. Still further, an investigation is often not the domain of only a single investigator (I). In many investigations, it is necessary to have a variety of persons which may be directly or indirectly working on the same case and it can be desirable to interconnect the information that they gather.

To begin the discussion, we are going to first look at the operation of the handheld computer (103) and how it will work in an embodiment. Generally, the computer (103) will be provided to a police officer or other investigator (I) charged with the collection of evidence (E) at the scene of the crime (10). As the scene (10) will generally not be within the evidence storage facility (20), the scene (10) will be considered a location remote from the base of operations of the investigator (I). Further, the scene (10) presents the first point of evidence (E) collection and therefore, generally, is the point where chain of custody needs to begin.

When evidence (E) is to be collected at the scene, the investigator (I) will initialize his computer (103) to begin the collection and processing of evidence (E). The computer (103) may be any form of portable computing device but will generally be a device which is easily man-portable, useable in the palm of the hand or in a variety of positions, and will be rugged enough to survive the rigors of operating in a variety of environments and weather conditions. The handheld device may comprise, but is not limited to, Motorola MC series devices (such as, but not limited to, the MC55XX, MC75XX, MC90XX, and MC95XX series), Intermec CN series devices, and other devices known now or later discovered which offer generally similar functionality. The device (103) will generally include memory and software designed to allow it to operate as the handheld device (103) of the present system. It may also include communications hardware and software to allow the device (103) to communicate with other devices (103'), computer networks (104), or other investigatory tools (105). In alternative embodiments, other devices may be used as computer (103) including, but not limited to, handheld computers such as a Palm Pilot™ or Handspring™, Tablet computers such as an Ipad™, smartphones such as an IPhone™ Blackberry™, or other portable computers.

Generally the computer (103) will be smaller than a standard laptop computer so as to provide for improved portability and ease of use. Specifically, the computer (103) will be designed to be easily transportable by hand and carried on the person. It is also preferably designed for at least partial one-handed operation. The computer (103) will generally have a variety of functions including having external connection ports for connecting to other devices such as a printer (111) or a larger computer. It may also include a camera, video camera, or other visual recording capability or may include a laser or other device designed to read specific types of machine readable media. It may also include positioning components such as Global Positioning System (GPS) access, internal navigational controls (such as, but not limited to, a gyroscope or compass), or other components for recording the device's position. The device (103) can also provide for indications of how the GPS signal is retrieved and calculated and can also compute the device's (103) relative speed or direction of motion.

The computer (103) will generally include onboard computer readable memory for the storage of input from a variety of sources as well as operational software and may include a user input device such as, but not limited to, a keyboard, stylus, or touch screen to allow for a user to enter information into the device (103). In an embodiment, the device (103) also or alternatively includes speech recognition or speech-to-text conversion which will allow the investigator (I) to enter information into the device (103) by speaking into a microphone or similar device and having it interpret the speech and fill in the entry. The handheld device (103) may also have access to a wireless network such as through a Bluetooth™, Wi-Fi, Cellular, or other standard network protocol. Regardless of the type of computer (103) used, the computer (103) will generally include software, that is computer readable code running on memory therein, or supplied via a network connection, which allows it to operate in accordance with the principles discussed herein.

Figures 2, 3:
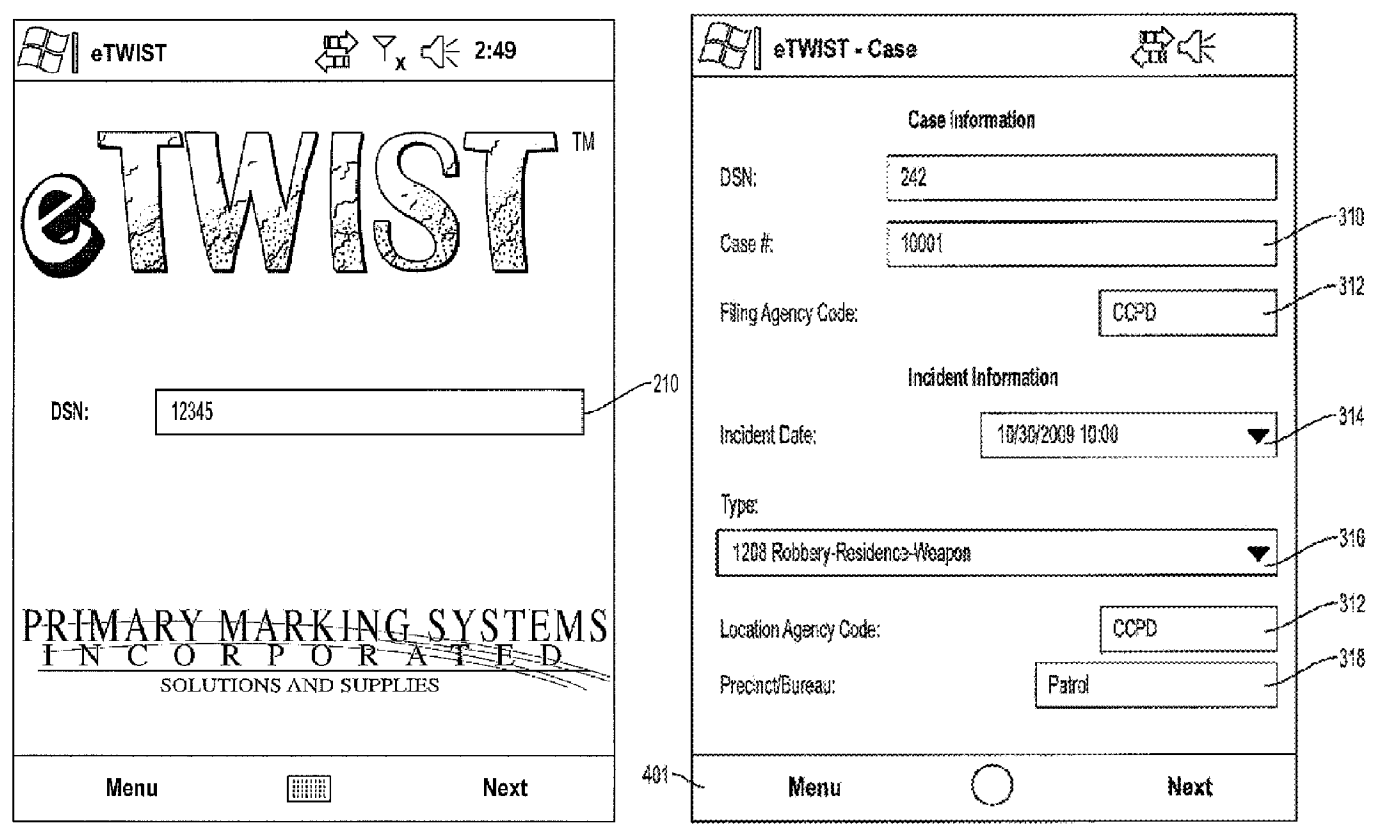

To explain the operation of the computer (103), it is generally most logical to walk through a series of screens as they would appear to a user. FIG. 2 provides for an embodiment of a login screen for the computer (103). As the chain of custody begins when evidence is initially collected, it is important to keep a record of who the investigator (I) is entering the information and using the computer (103) when it is being used for the initial classification of evidence (E). In this case, the investigator (I) is assigned an identifying code (referred to herein as a DSN) which they will enter into an appropriate entry area (210) or computer (103) to commence operation of the software. The DSN may be secret, but more commonly will be public and may be coupled with a secret password or other piece of secret material information to both keep information on the computer (103) secure, and more definitively identify the investigator (I). While such definitive secure identification is generally preferred in most embodiments, it is not strictly required unless necessary to support legal evidence proceedings. It should be recognized that in alternative embodiments other forms of identification of the investigator (I) including, but not limited to, bioinformatic scanning, passwords, dongles or other hardware-based identification solutions, or other technologies may be used to identify the investigator (I) who is initially gathering the evidence and working with the evidence entries. The investigator (I) may also be identified by a signature capture or similar technology.

Once the investigator (I) is logged in, they will move to the screen of FIG. 3 where they will enter case information. The log-in is generally desirable as it has now connected the investigator (I) associated with that log-in identifier to the actions which are to be performed. Thus, this investigator (I) has initial custody of the evidence (E). Certain fields in the various screens of FIGS. 2-14 may be designated as mandatory to provide that certain information must be entered before the investigator (I) can advance from the screen. The specific mandatory fields will generally depend on embodiment, however, identification of the investigator (I) and case (310) are generally the most likely to be required. The system (100) will also attach the collected evidence (E) to the specific case (310) to which it is thought to be relevant. Thus, the evidence (E) will initially be collected with two identification items, the investigator (I) collecting it, and the case it is associated with. Generally, case (310) information will be newly entered at the time the new case (310) is opened. However, should the evidence being collected be for a prior case (310) which was already opened, the investigator (I) may open the case (310) on their computer (103) or may access a wireless or other network connection and download relevant case information directly to their computer (103) so as to add to it. The investigator (I) may also enter the information as a new case without recognition at the time it is entered that it is connected to a prior case. Such connection may be made at a later time when more information is known and may be done at the central server computer (301).

As should be apparent from FIG. 3, the case identifying information can include identifying information for the case including the case number (310), the relevant investigatory agency or jurisdictional authority (312), and details of the incident date (314), type (316) and location (318). Once the case information has been entered, evidence is ready to be collected to be attached to the case (310).

In the present embodiment, evidence (E) is all collected in connection with the case (310) and is stored in connection with that identified case (310). In this way it is relatively straightforward to determine what evidence (E) is necessary in the trial or other proceedings associated with the case (310). Further, such case (310) connections are an easily understood way for users to connect the evidence (E) which is collected and associated together. However, in an alternative embodiment, the case (310) connection is unnecessary and the evidence (E) may be connected using another connection method, or no connection at all.

Because there are a number of different types of evidence (E) that may be collected, or even that may exist or be created at this time, the computer (103) provides for a variety of different screens that allow for entry of information to identify and catalog evidence (E). A menu of these may be obtained by activating the menu key (401) and indicating which type of information is desired to be entered.

The first type of evidence (E) we will discuss here is suspect information. This is discussed first merely to provide order to the discussion herein, it should be recognized that, in an embodiment, an investigator (I) can enter the types of evidence discussed herein in any order and need not complete any entry before beginning on another. Suspect information is usually interpreted evidence and will generally comprise information collated by the investigator (I) to identify a potential suspect. In some cases, the information may be relatively specific pointing to a specific known individual. In other cases, only basic, general, identifying information may be known. In still further cases, a suspect may be relatively unknown at the time of initial evidence (E) collection.

Figures 4, 6:
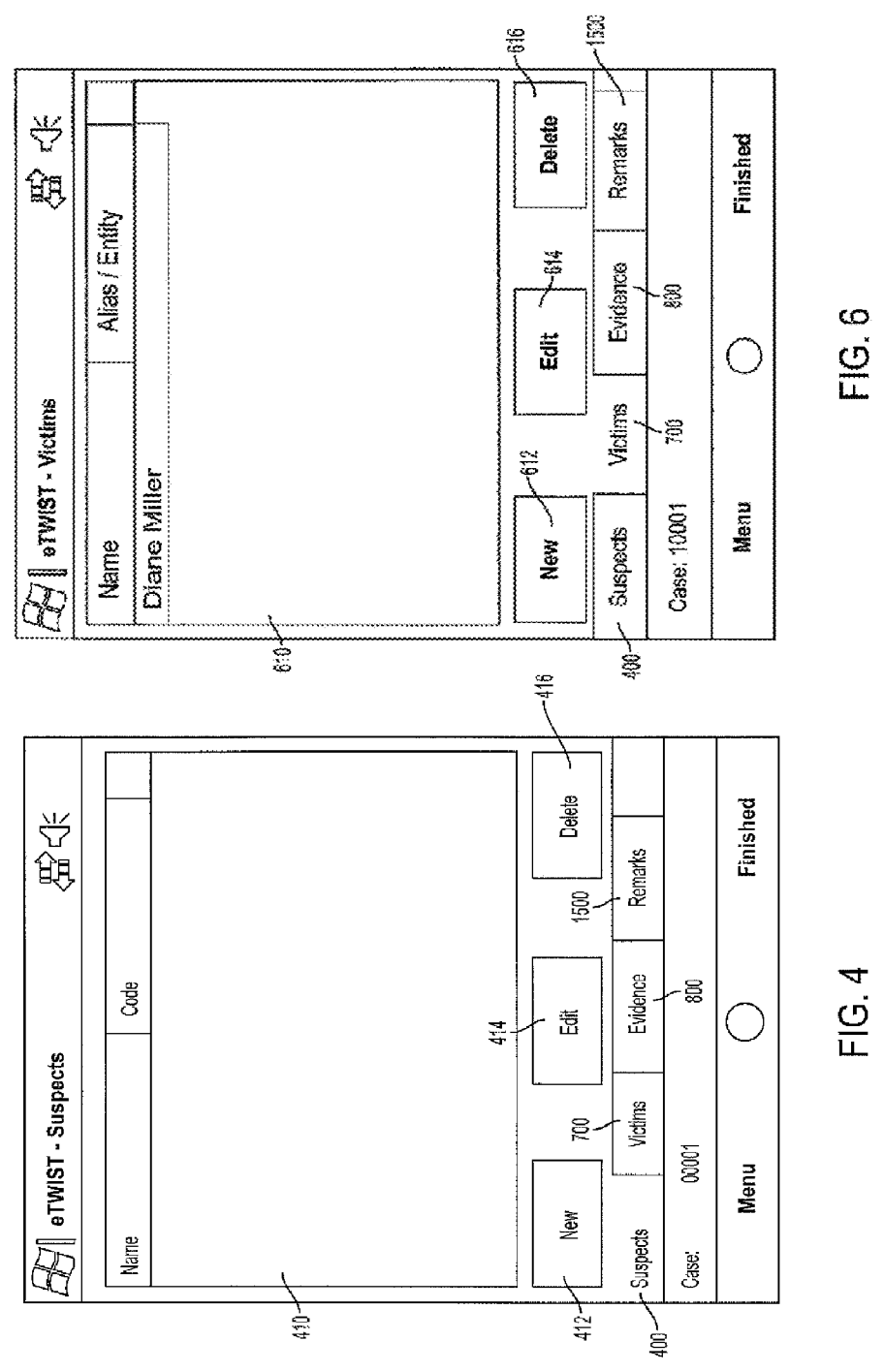

If there is a suspect in the incident, information about that suspect may be entered into the system (100) to store that information in conjunction with the case. FIG. 4 provides for an indication of a suspect list screen (410). In this depiction, there are no suspects yet entered so the list area is empty. The investigator (I) would select new (412) in order to begin a new suspect entry. Should there already be suspects listed, the edit (414) and delete (416) functions could also be used.

This form of evidence list (410) where there is a list of previously entered evidence of a particular type available and a place to edit, add to, or delete information will be common throughout the various collection and classification mechanisms of the depicted embodiment. In effect, the computer (103) will provide a list of all types of information that have been previously collected and will allow the investigator (I) to either edit previous information (for example, if new items are learned) to enter new information, or to delete old information. In this way, the handheld device (103) computer (205) or central computer (201) can be used in the same fashion that a traditional investigator (I) may have used a note pad. It should be also be noted in FIG. 4 that the different types of evidence, including the suspects (400), victims (700), physical evidence (800), and notes (1500) are all accessible by tabs so that all evidence (E) in the case (310) is accessible.

For ease of reference, the suspect or other entry of a single piece of evidence (E) is identified herein as an "evidence entry." An evidence entry is generally all interrelated information pertaining to a single "thing" that "thing" being a piece of evidence. It should be recognized that such "thing" may be a physical thing (e.g. a gun) may be a person or other individual (e.g. a dog, or a suspect), may be something transitory (e.g. a blood spatter pattern, a position of a body), or may be an observation or note. Further, individual pieces of evidence may be related (e.g. a gun and casing from the bullets it fired). In order to provide for segregated entry, each piece of evidence may be considered to correspond to an evidence entry, thus each entry is effectively a piece of evidence, regardless of type of relationship to other entries. Each entry would be listed by type in a list such as list (410). Therefore, the evidence entries together catalog all the evidence (E) collected.

Figures 5A, 5B:
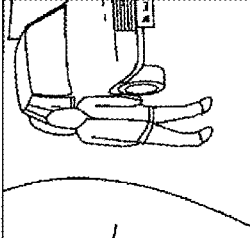
FIGS. 5A & 5B show entry screens for suspect data on the portable computer.

FIGS. 5A and 5B provide for a place to enter information about the suspect adding details to that evidence entry. This can include their names (510) (512) and (514), alias (516), vital statistics (518), address (520), current contact information (522) and notes (524) should additional information be desired and there is no specific entry point for it. The status of the suspect (526) may also be entered. Each entry point may provide for free form fields, or may provide for a selection of prepared choices. For example, the name field will generally allow for a user to enter any word as names are often unique and even similar names may reflect differences in spelling or pronunciation. For a field such as the user's gender, however, there are generally limited options in that a suspect is either male, female or unknown. The different screens of entry points for information are generally accessible by tabs (501) and (503).

It should be recognized that in an embodiment, the system (100) does not require that all information be present in order to record the known information, and may even provide for the ability to enter a detail that indicates a lack of knowledge. For example, while a suspect's gender is limited to male or female, the field may include alternative entries which would allow for an investigator (I) to enter other information about gender. For example, the field may allow a user to indicate that the gender is currently unknown (e.g. that no details of the suspect are known), that the gender is unclear (e.g. that there is an indication of gender, but it is uncertain), or even that the gender is not one of the two standard choices (e.g. that a suspect is a non-human animal).

The ability to enter additional information is an important feature of an embodiment of the system. While the system (100) is designed to enter expected information and to provide for easy organization of expected information, it will generally also be the case that the system is versatile enough to handle the unexpected. In the investigation of crimes, it is often the case that information is limited, contradictory, or even unbelievable. In these situations, it can be important that a user of the system (100) be able to provide for interpretative evidence in a freeform fashion and that they not be constrained by what the system (100) thinks comprises necessary information. For this reason, virtually every input has a free entry area, such as notes (524), where interpretative evidence may be entered by the user without constraint.

In an embodiment, the handheld computer (103) will include the ability to take digital or other pictures as part of its functionality. Therefore, the screen of FIG. 5A also provides for the ability to take (528) and delete (532) pictures that are associated with this particular suspect. In this embodiment, the picture (534) is then directly attached to the suspect information to allow them to be stored together. Generally, the picture (534) will be obtained directly by a camera onboard the handheld computer (103) which may be used to take a picture of a suspect who is at the scene. Alternatively, the picture (534) may added to the file using another method of information capture. For example, if the victim has a picture of the suspect on their digital camera, the file may be directly downloaded from their camera to the handheld computer (103) and then stored as the suspect picture (534).

It should be apparent that the suspect and notes storing component of the system (100) is designed to provide for information directly related to people potentially involved in the incident. This will only rarely be physical evidence (although there may be a connection to physical evidence) but will instead comprise photographic evidence or interpretative evidence that is collected by the user. Thus, the system (100), in this embodiment, serves as both a notepad whereby the investigator (I) can record information that they think may be valuable, and also allows those notes to be used and referenced.

The computer (103) can also provide additional information to the evidence entry. In an embodiment, the computer (103) provides such information from its own access and resources. For example, the computer could provide a system time and date or may attach GPS coordinates indicating where the photo was taken. There may also be provided an indication of the GPS signals accuracy or if it matches with an internal position calculation. The device (103) could also provide a compass signal to indicate the direction the device (103) was facing at the time a photo was taken or could provide more esoteric information, such as if the computer (103) could detect a wireless network at the time or the speed at which text was entered.

Once the information of a suspect has been entered by the investigator (I) to the point where the investigator (I) is satisfied with the completeness of the entry, the suspect information is saved as an evidence entry identified as information on the suspect and the entry is listed in area (410). As should be apparent, depending on the specific information available, the amount of information entered may vary widely in completeness with some entries having virtually complete information while others may comprise information in only a single field. The recordation of the suspect effectively starts the chain of custody of this piece of evidence (if needed) as it is now associated with the case and investigator (I) who entered it.

Like suspects, there are often people who are not suspects but where information recorded is useful. One very clear case is that there may also be victims of the incident and these are discussed in conjunction with FIGS. 6, 7A and 7B. The pages of entry are very similar and provide for a listing of victims associated with the incident (610) which may be manipulated by adding new entries (612), editing existing entries (614) or deleting entries (616), as discussed above. Further, the same information is used as for suspects including victim's names (710) (712) and (714), aliases (716), vital statistics (718), address (720), contact information (722) and freeform notes (724). Again, photos (734) can be taken (728) and connected with the case or may be deleted (732) later, and the information screens are accessible by tabs (701) and (703). Internal device information such as date, time, location, and others may also be added.

In a further embodiment, while the depicted embodiment is limited to storing information on suspects and victims, menu tabs can also be provided for similar information on witnesses, bystanders, or present investigators (I), should such information be considered worth recording at the time. As such entry would be very similar to the entry of information on suspects and victims, it is not separately discussed as the methodology is clear from the above.

As should be apparent, the ability to connect pictures with the case can be very useful. For example, if the victim needs to be found, inclusion of a picture can provide for potentially useful information later. Further, the inclusion of a picture can help insure that victims and suspects which may share names with other victims or suspects are appropriately kept separate or are kept together as appropriate. Further, the appearance of an individual at the time the evidence entry is created can be very useful. For example, should a witness identify that a suspect has a beard, and the suspect, when first located has a beard that they later shave, the fact that they had a beard at the time of the incident has been recorded. Similarly, if a victim had visible bruises, these could be recorded. The handheld computer's (103) ability to take such pictures provides for further benefit as it means that there is less likelihood of a picture being separated or lost from the information about the suspect, victim, eyewitness, or other relevant person prior to entry and provides that the investigator (I) has ready access to a camera. Further, the ability of the device (103) to combine this information with other available information such as, but not limited to, date, time, location, facing, or the like can provide valuable additional description of the picture.

Figures 8, 9:
FIG. 8 shows a notes or remarks entry screen on the portable computer.
FIG. 9 shows an evidence list screen on the portable computer.

FIG. 8 provides for a general remarks area (1504) whereby any additional information which does not make sense to be included anywhere else can be entered (812), edited (814), or deleted (816). Again, this information is connected with the specific case and is stored as an evidence entry (1502) along with a date/time recordation stamp or other provided information. As discussed above, there is always the possibility of an investigator (I) feeling that information which does not fit into the established material framework of the system (100) needs to be recorded. As one example, if the temperature could have an effect on the way something appeared, that may be a useful piece of interpretive evidence to record in the notes area.

While the collection of information related to individuals involved in the incident is important and provides for useful functionality, in most situations the vast majority of the evidence to be collected will not be related to identification of parties, but will be related to physical evidence left at the scene, or collected during later investigatory activity. Further, in the above described components of the system (100), individuals are usually more transitory. That is, the entry stands alone as evidence (or works in conjunction with a person which cannot be easily confined to an evidence locker). Therefore, the chain of custody of the evidence is often limited to the photographic and other information in the evidence entry itself and chain of custody of the individual may not be as important. When it comes to physical evidence, however, the evidence itself is often stored in addition to the information in the computer system (100). Thus, storage can require connections that are not necessary for information on individuals.

FIGS. 9-14 are directed to screens for the collection of physical evidence. Much of the data gathering of the system (100) is focused on the collection and identification of physical evidence due to the increased chain of custody requirements. In FIG. 9 there is provided, as with the suspects (410) and victims (610), a list (910) of the physical evidence which has been collected. In this case, there is only an entry (1402). Thus, the only physical evidence collected is the firearm believed to have been used in the incident, a 0.357 magnum revolver.

Associated with the evidence entry for the revolver are a variety of informational items directed to that piece of evidence (E) including, but not limited to, descriptions and related identifications. As things are often less "individual" than suspects or other persons involved in the case, it is often necessary to make a piece of evidence "more individual." To use a simple example, if 20 shell casings of identical make and caliber are found at a scene in different locations, it may be necessary to keep track of which were found where as they may have been fired by different guns.

Figures 15A, 15B:
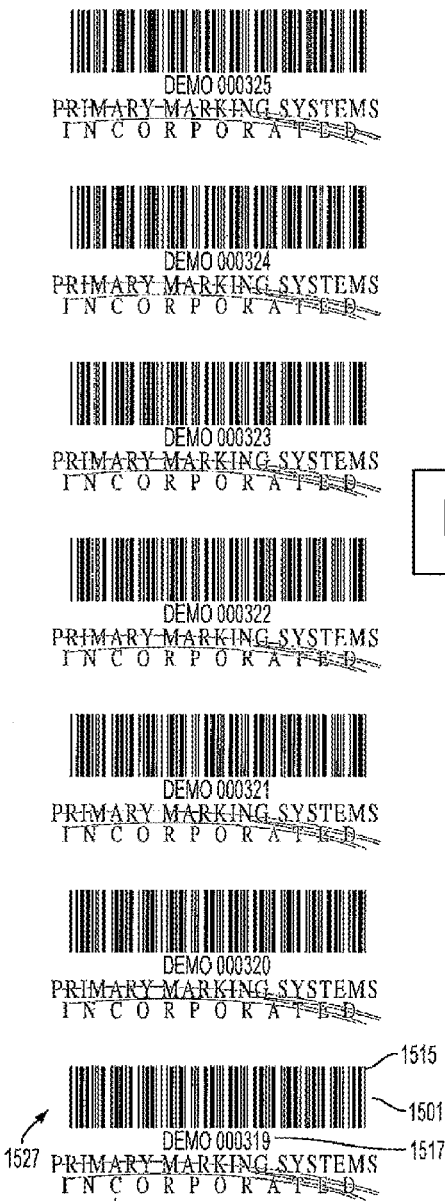
FIG. 15A shows a label which may be used to tag evidence.
FIG. 15B shows a tag which may be used to tag evidence.

In order to make individual pieces of evidence (E) more unique, each piece of evidence (or a group of pieces of evidence if appropriative) can have a unique identifier associated with it. Some embodiments of such tags (1501) and (1503) are shown in FIGS. 15A and 15B. In a preferred embodiment, this tag (1501) or (1503) is attached directly or indirectly to the evidence so that the evidence item plus tag (1501) or (1503) becomes a more readily identified "individual" item. It is preferred that the tag (1501) or (1503) be attached to the evidence (E) in a generally permanent fashion or in a fashion where the tag's (1501) or (1503) removal would be relatively easily to detect. As the tag (1501) or (1503) and evidence (E) combination is being used to make the evidence (E) more unique and improve the ability to segregate this evidence (E) from similar evidence, it is important to detect should something happen which would compromise that connection. By making the removal of the tag (1501) or (1503) more easily detectable, such removal would need to be explained.

In order to allow for tagging of evidence (E), an investigator (I) will generally be provided with a plurality of tags which can be used on the evidence (E) during the investigation. These may be provided with the handheld computer (103) as part of a kit or may be printed by a printer (111) associated with the handheld computer (103). Embodiments of such tags (1501) and (1503) are shown in FIGS. 15A and 15B. The tags will generally include at least a portion which is self-adhesive and may comprise labels (1501) as provided in FIG. 15A or attachable suspended tags (1503) as provided in FIG. 15B. The attachable suspended tag format (1503) will generally be preferred as it provides for greater ease in attaching the tag (1503) to a variety of different things.

In the embodiments of FIG. 15B the tag (1503) comprises a tag of generally barbell shape having two wide ends (1531) and a narrower connection center (1533). The ends (1531) will generally include a computer readable identifier (1535) and may include a human readable identifier (1537) as well. The tag (1503) may also include other information such as, but not limited to, an identification of the investigatory authority, a manufacturer's marking, or a tamper indicator. The tags (1503) may be paper or may comprise alternative materials such as plastic. In the depicted embodiment, paper tags are used for ease of printing. In order to inhibit damage to tags (1501) or (1503) printer (111) may utilize thermal image transfer or a similar technology that inhibits the ink from being damaged by exposure to light, heat, or moisture. The tags (1503) may also include a plastic cover surface or may be treated so as to protect the printing of the tag (1503) from water or other liquid damage.

Generally the back side (1557) of the wide ends (1531) will be removable so as to provide for an adhesive surface to allow the tag (1503) to be stuck to itself, or to a piece of evidence (E). The center section may also comprise such adhesive and the backing may be designed to be removed as a singular piece or as multiple pieces. The adhesive provided will generally be designed to be considered a generally permanent adhesive so that the adhesive will bond securely to a variety of surfaces. Specifically, in the Embodiment of FIG. 15B, the adhesive will generally have sufficient adhesive strength such that if the two ends (1531) of the tag (1503) are adhered together, the tag (1503) will more easily rip than the adhesive will separate. This provides that once attached to the piece of evidence (E), the tag (1503) is generally only removed by a destructive act to the tag (1503), making such removal detectable.

The alternative embodiment of FIG. 15A provides for a more standard shaped label (1501) which is used as a tag. This label (1501) is a more standard rectangular shape and also includes a computer readable identifier (1515), human readable identifier (1517), and indication of manufacturer (1519) and may be constructed in any of the fashions discussed for the embodiment of FIG. 15B. Again, it may have a removable surface on the back (1527) which can be peeled to expose an adhesive.

The tag (1503) will generally be preferred over the label (1501) as it is generally easier to attach to a variety of different types of evidence (E) without necessarily damaging or hindering access to the underlying evidence (E) and still being readable. The label (1501) will generally work well on flat surfaces which it can be directly contact to (for instance a piece of glass) but will often not work well if it needs to go around a component or may need to be removed to perform testing on the evidence (E). The former is problematic as the curve applied to the label (1501) may make it difficult for a machine to read the machine readable indicia (1515) or to attach the label (1501) to oddly shaped materials or those that resist the attachment of labels (1501) (for example those with a grainy or rough surface). The other problem is that the attachment of the label (1501) could cover a valuable piece of evidence (E) and removal of the label (1501) is designed to be difficult. For example, if the evidence (E) is a sheet of paper, removal of the label (1501)

would generally result in damage to the evidence (E), and not just the tag (1501), which may be undesirable in certain circumstances.

Generally, the tag (1501) or (1503) will be attached to the evidence (E) by the initial investigator (I) at the time the evidence (E) is being collected. This will often be done initially upon collection; however, in some circumstances it may be necessary to produce photographs of the evidence (E), such as, but not limited to, showing its positioning, prior to the evidence (E) being handled in any way. In this situation, the evidence (E) may first be photographed (at least partially) prior to the tag (1501) or (1503) being attached.

The attachment of the tag (1501) or (1503) to the piece of evidence (E) creates a piece of tagged evidence. Generally, it will be the case that a single tag (1501) or (1503) is used for each single evidence entry in the computer system (100). Thus, if a single tag (1501) or (1503) is used on many items which are located together (for example a stack of money), the stack is treated as an individual evidence entry. This methodology is by no means required, however.

FIG. 9 provides for the entry of individual pieces of evidence (E) in the same fashion that suspects and victim entries were discussed above. As the general listing of entries is similar, no further discussion is provided herein. In order to provide for improved identification, As shown in FIGS. 15A and 15D, the tag (1501) and (1503) will generally include both a human readable indicia (1517) or (1537) and a machine readable indicia (1515) or (1535) where the human readable indicia (1517) or (1537) corresponds to the machine readable indicia (1515) or (1535) which, in this case is a barcode. As the tag (1501) or (1503) is now associated with the particular piece of evidence (E), these indicia may now be used as an identifying name for the evidence.

Figure 10:

In FIG. 10, the investigator (I) can enter the human readable indicia (1517) or (1537) into the system (100) via box (1002). Alternatively or additionally, the tag (1501) or (1503) can be electronically entered via the machine readable indicia (1515) or (1535) utilizing an onboard function of the computer (103) capable of reading the machine readable indicia (1515) or (1535). This may comprise a laser or otherwise specialized component of the handheld computer (103), may comprise utilizing the onboard camera to take a pictures of the indicia (1515) or (1535) which picture is then interpreted by software on board the handheld computer (103) or another function. As the evidence entry (1402) has now been made, like in the situations above, the user can then enter additional identifying information about the evidence. This can include, among other things, the owner of the evidence (1004) and (1006). In this case the owner is a known suspect as indicated in box (1004), the suspect listed previously in FIGS. 5A and 5B. Therefore, the system allows selection of already entered suspects and is selected via a menu providing the suspect entries already associated with the case.

A variety of other selectable or typeable fields can be included in the identification depending on the needs of the investigator (I). For example, if it is known that the evidence (E) was used in the incident, but it is unknown who the suspect may be, the owner may be listed as a suspect—unknown in box (1004) to point out that the object is likely connected with the suspect, but the suspect is unknown at the time of entry. Similarly the evidence can be connected with other known or unknown parties and affiliations. For example, should a gun be found at the scene of a stabbing, its connection with the case may be completely unknown and may be identified as such. In the event that the evidence (E) is not connected yet with a person having an evidence entry under one of the other sections, the box (1006) may not utilize the search and may allow new typed entries, or may gray out to inhibit entry therein.

The identifying information for the evidence (E) will also generally provide for a type of evidence (1008) along with an indication of its connection with the incident. There may also be certain uniform identifiers (1010) related to categories used by police agencies and certain parties to allow for their own classification of materials. This can be valuable as certain types of evidence (E) may need to be stored in particular facilities, under particular conditions, or may have specific disposal requirements. There is also a place where a description by the recording officer can be entered (1012) to provide for other free form information.

Figure 11:

In FIG. 11 there is provided a screen showing other information about the piece of evidence (E). As the physical evidence generally requires different information than a suspect listing, for example, this screen may provide for specialized information about the evidence (E). Specifically, the disposition field (1014) discusses what to do with the piece of evidence once the case is completed or should it turn out that the evidence is unneeded or unrelated to the case. Thus, should a piece of evidence (E) be collected which appears to have no connection to the incident, the item can be disposed of to avoid it taking up space in evidence storage. Similarly, the listing includes a unit of measure (1016).

The unit of measure (1016) can be particularly useful for certain evidence (E) where there may be more than one "item" collected at once and placed in a single evidence entry, for example, currency or illegal drugs. In the currency situation, it may be desirable to calculate the quantity (1018) of currency in total money (e.g. if $57 was found in the victim's wallet or if a stack of bills contained $1000). Alternatively, it may be useful to keep note of the type of bills located (e.g. 100 $1 bills) or may be useful to utilize a more combined approach (e.g. 1 roll of quarters). Similarly with drugs and other bulk items, knowing if a measurement is made in grams, pounds, or other units of measurement can be helpful. These amounts can be valuable as they allow for further identification of the evidence (E) and can allow for the quantity (1018) to be put in using whatever measuring devices may be handy at the time. The quantity (1018) may be entered directly by the investigator (I), or may be calculated and entered directly by a peripheral connected to the handheld computer (103). For example, a digital scale could be connected to the handheld computer (103) to provide for a precise weight at the time of collecting. Even if the scale is not directly attached, the scale readout could also be recorded by utilizing a photograph showing the evidence (E) and scale readout as part of the evidence entry.

Figure 12:
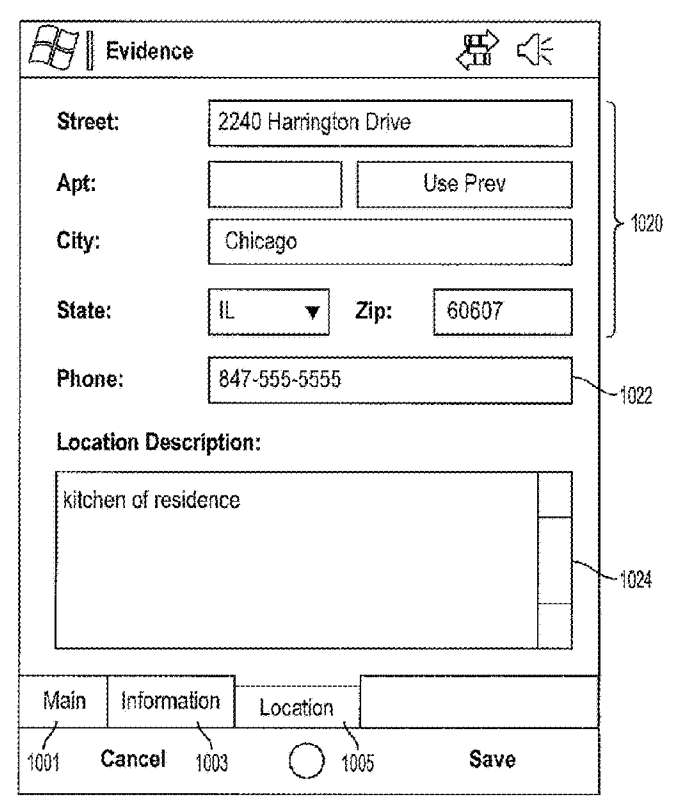

FIG. 12 provides for a place to indicate where the evidence (E) was located. This can provide for address information (1020) and contact information as used for suspects, but also provides an open description box (1024) to allow for the user to enter freeform information. Thus, if the evidence (E) was located on a person, the address information could be entered of where the person was located, and the location on the person of the item could described. Similarly if the device was hidden, the hiding place can be described. It should be noted that the different entry screens of 10, 11 and 12 are accessible by tabs (1001), (1003), and (1005).

FIGS. 13 and 14 are directed to the storage of photographs in conjunction with the piece of evidence (E). As indicated above, the recordation of photographic evidence of the evidence at the time the evidence is collected can allow for additional information to be maintained. Further, some evidence (E) cannot be removed and stored for trial. For example, it is generally impossible to record the specific location where evidence (E) was found as the location is not transportable and a description may be somewhat subjective. In such situation, photographic evidence in conjunction with physical evidence may be useful. As many of the handheld computers (103) suitable for use in the system (100) will include internal digital cameras, the system (100) allows for the onboard camera to be used in conjunction with recordation of such photographic evidence. As discussed previously, this can also be combined with system information to provide further explanation of the photos such as, but not limited to, date, time, location, or device (103) facing.

Further, placement of the evidence (E) with other supporting information, such as a photograph of where it was located or with items such as a ruler or other common identifier can also be helpful in understanding the evidence (E). For example, should evidence (E) be located in a particular room or be at a particular position on the floor, a photograph showing the position may prove useful later. Further, making photographs of the evidence (E) contemporaneously with its collection can provide further indications that the evidence (E) indicated is uniquely identified. A photo at the time can also show specific characteristics of the evidence (E) such as, but not limited to a distinctive scratch on a grip or the position in which the tag (1501) or (1503) is placed.

FIG. 13 provides for the picture to be connected with the specific evidence (E) contemporaneously with the evidence's (E) collection in a similar fashion to the use of photographs of suspects or victims discussed previously. As can be seen, in this screen the picture (1334) is shown along with a description (1320) which can be entered about where the picture is taken, angles, dates, backgrounds or any other useful information. The description (1320) will also generally be used to identify the photo in photo list (1326). The system also provides system entered information such as, but not limited to, the date, time, location and direction the picture was taken to also be provided in the entry (1330).

As should be apparent from FIG. 13, the evidence (E) may have multiple photos connected to it. Because of this, the photo list (1326) is used to provide for a larger collection. Further, the screen of FIG. 13 provides for more manipulation tools to show increased functionality such as allowing a user to enter multiple new photos (1324), reshoot or edit existing photos (1328), or delete photos (1332). The description can also be edited (1322). FIG. 14 simply shows an internal camera view (1434) of the handheld computer (103) as would be used when taking the picture.

Once the information on the physical evidence has been entered to the satisfaction of the investigator (I) using the screens of FIGS. 9-14, the evidence entry (1402) is completed for the physical evidence. As should be apparent, the electronic file is already linked to the physical evidence (E) by means of the tag indicia (1537) or (1517) shown in box (1002). However, it will generally be desirable to provide for further connection and to improve ease of storage of the evidence (E). Often, the evidence (E) needs to be relatively isolated from the outside environment. Specifically, the evidence (E) will need to be examined for fingerprints or particles of substance which may be on it and it is necessary to make sure that alternative elements are not introduced by transportation or storage. In these cases, the evidence (E) is generally stored in evidence bags which serve to provide some isolation.

Evidence bags are generally used to prepare the evidence (E) for transport to a particular storage facility, for storage, and for later processing and evaluation. It is rarely the case that evidence (E) collected at the scene needs to have nothing further done with it. Instead, evidence (E) is usually transported to a secure storage facility where it can be stored and available for analytics to be performed thereon, and can be stored long term in preparation for trial. This will often be carried out by placing one or more pieces of evidence (E) from the case in an evidence bag (1702) for storage. While evidence bags are generally of a common design, each evidence bag is generally individually labeled in a fashion which connects the evidence (E) in the bag to the bag (and the bag in turn is then connected to the chain of custody). The evidence bag (1702) is generally labeled so as to indicate what evidence (E) is stored in the bag and what case the evidence (E) is connected with.

Figure 17:
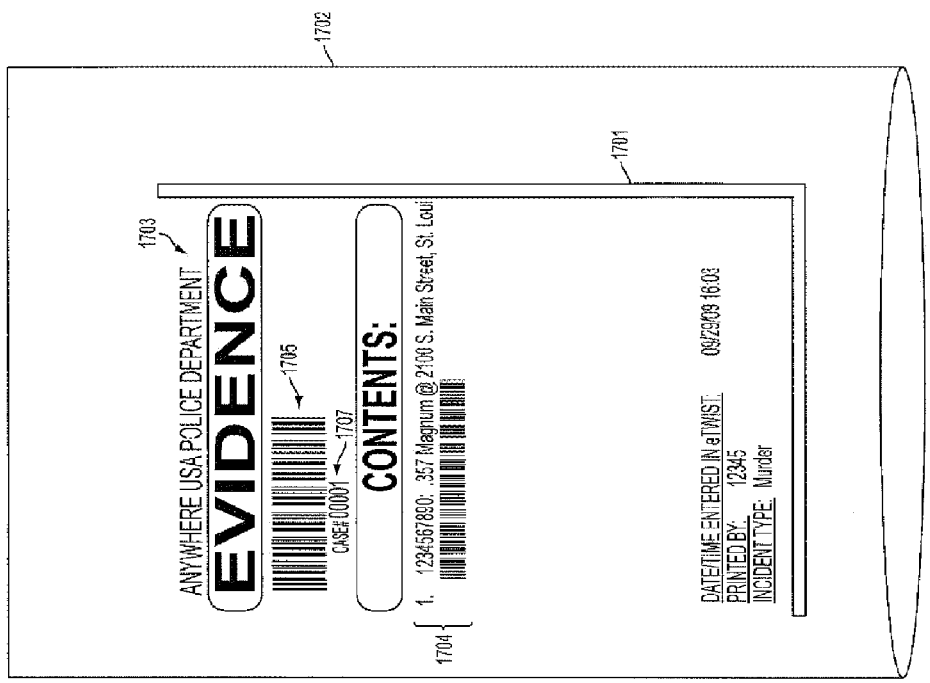
FIG. 17 shows an evidence bag and printed label.

In an embodiment of the present device, once sufficient evidence has been collected to be bagged, the investigator (I) will generally prepare a custom bag label as shown in FIG. 17 by having the handheld computer (103) utilize a printer (111) to print the label (1701). Where the printing of a bag label (1701) occurs depends on embodiment but will often occur either at the scene, with the Investigator having been provided with a "table top" or "desk top" type, or other type, of printer, or may occur at the storage facility (20) prior to the evidence (E) being checked into secured storage (203). Generally, having the bag labels (1701) printed at the storage facility (20) is preferred as it means the Investigator (I) does not need to carry a printer which may take up additional space. However, certain investigatory authorities utilize crime scene vans or trucks which allow for increased processing of evidence at the scene. In such a situation, such a vehicle may carry the printer (111) and provide access at the scene.

In addition to the bag label (1701), in an embodiment the handheld computer (103) may also generate other paperwork associated with the evidence. This can include, but is not limited to, evidentiary forms, deposit forms, and request forms. In an embodiment, the handheld computer (103) can actually use the evidence (E) already stored on its system to issue a citation, warrant, court document, or other document based on the evidence (E). For example, if a certain crime was dependent on having a certain amount of an illicit substance on one's person (e.g. more than 1 gram), if the system (100) had records of more than 1 gram of the substance as having been collected, a citation for that crime could be issued directly from the printer (111). This can eliminate the need to connect the evidence to the citation as the citation can be directly connected to the relevant evidence (E) via the system (100) at the time the citation is issued and the evidence collected. This can be particularly useful where the criminal penalty involves paying a fine and confiscation of the evidence as it allows the handheld device to partially automate and integrate the actions of collecting the evidence, issuing the citation, and storing the information for trial (if needed).

Figures 16A, 16B:
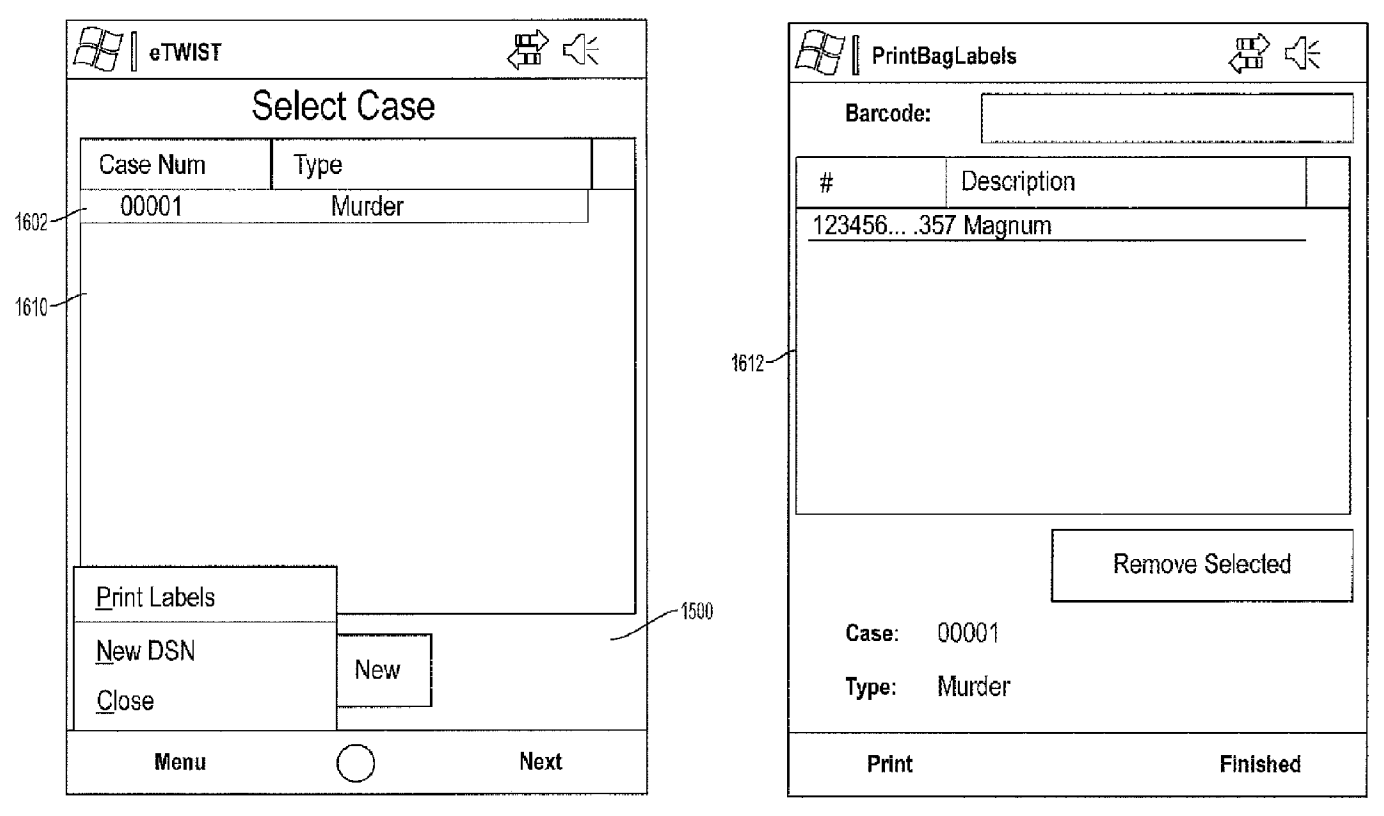
Figure 16C:
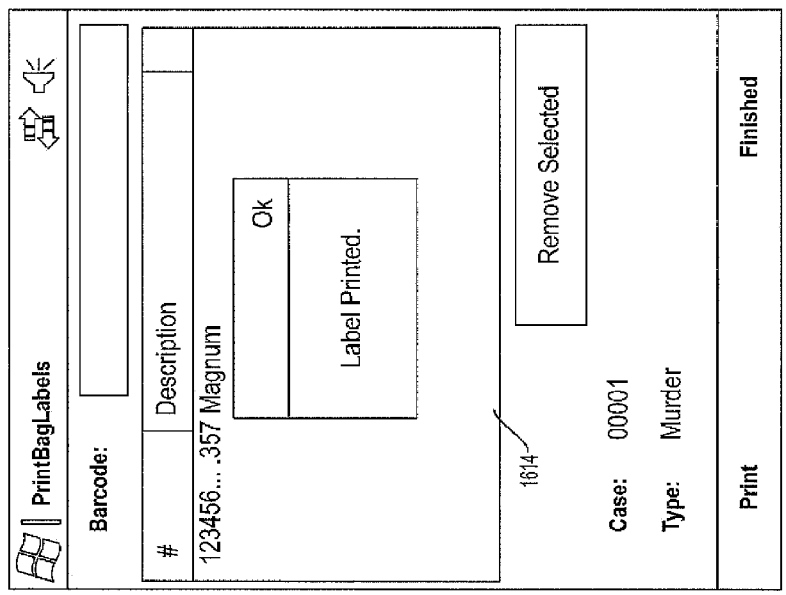
FIG. 16C shows a screen with an evidence label having been printed.

Regardless of where the bag labels (1701) are printed, they are generally printed prior to the evidence (E) being sent into secured storage (203) and will often be printed by action of the handheld computer (103) instead of central computer (201) or other remote computers (205) so that the bag's (1702) are labeled prior to the evidence entries being uploaded from the handheld computer (103) to the central computer (201). FIGS. 16A, 16B, and 16C provide for screens to load the evidence list (910) from the current case and then print an evidence bag label (1701), such as that shown on FIG. 17 as the evidence (E) is gathered at the scene. FIG. 16A allows for selection of the current case (1602) from a list of cases (1610), FIG. 16B provides a list of the present evidence in this case (1612) and FIG. 16C provides for loading and printing (1614). It should be noted that any paperwork necessary as an evidence report could also be printed using the same or similar system.

As shown in FIG. 17, the evidence bag label (1701) will generally indicate the relevant investigatory authority (1703) that has the evidence (E) and will include a machine readable identifier of the bag (1705) which will be associated with the specific case (1707). The label (1701) then also includes an indicator (1704) of the evidence (E) within the bag (1702). This can include a description as well as reprints of the machine readable (1515) or (1535) and/or human readable (1517) or (1537) identifier corresponding to the evidence tag (1501) or (1503) on the evidence (E).

The inclusion of the tag (1501) or (1503) allows for evidence, when checked out, to be reconnected to the bag (1702) and for the bag (1702) to itself be connected to the case (310) in the same way the evidence (E) it contains is connected. For example, when the evidence (E) is placed in the bag (1702), the tag (1501) or (1503) on the evidence (E) and the tag (1701) on the bag (1702) may both be read by the device (103). If they match, the machine OKs putting the evidence (E) in the bag (1702). If they do not, the device (103) indicates that the tags (1501) or (1503) do not match and that the wrong piece of evidence (E) may be being placed in the bag (1702). Similarly when the evidence (E) is removed from the bag (1702), the party removing it can scan both the tag (1501) or (1503) and the bag label (1701) to indicate that the evidence (E) in the bag (1702) is still the evidence (E) indicated on the bag (1702). In this way, should a party be working with similar pieces of evidence (E) and inadvertently get the two items crossed, the problem will be quickly corrected and the evidence chain will remain solid. Essentially, the bag (1702) and evidence (E) tag (1501) or (1503) co-identification provides for one further assurance that the evidence's (E) custody has been maintained. In the depicted embodiment, the machine indicator (1515) or (1535) is not used in favor of the human readable indicator (1517) or (1537).

Once evidence (E) has been bagged, it is essentially ready for deposit with an evidence locker and will be prepared for transport. Generally, the evidence bags (1702), along with the investigator (I) and the handheld computer (103) will be transported to a central storage facility (20). The central storage facility (20) will generally comprise a hardware facility for the storage of the physical evidence (e.g. an evidence locker) (203) along with a central computer system (201) designed to inventory the contents of the hardware facility (203). Upon arriving at the facility (20), the evidence (E) will be presented to the hardware facility (203) for storage and the handheld's (103) memory, including all the evidence entries, may be transferred to a central computer system (205). Such central storage (20) is generally used both to store the physical evidence (E) and to store the electronic evidence entries to provide for increased security and safety of data and evidence while also allowing for others to access the data.

The data may be uploaded to the central computer (201) from the handheld computer (103) by any means known to one of ordinary skill. In an embodiment, the information will be uploaded wirelessly or via another remote network either directly from the handheld computer (103) or via a car mounted computer or laptop computer that the handheld computer (103) is connected to. In another embodiment, the handheld computer (103) may be taken to the physical facility (20) and then plugged into or otherwise connected to the central computer (205) and the data is uploaded as the evidence (E) is placed into storage.

Generally, the information on the handheld computer (103) will be uploaded to the central computer (201) relatively simultaneously with the physical evidence (E) being presented for storage in the locker (203). This will therefore allow for the chain of custody to be securely passed to the next person. As the evidence (E) is all securely in bags (1702) and the correct items being in the correct bags was verified when the items were placed in them, the bags (1702) are generally checked into the facility (203) along with the evidence entries from the handheld computer (103) being provided to the central computer (205). In an embodiment, when the computer records of the evidence entries are uploaded, the bags (1702) are scanned and the computer determines that all bags (1702) listed are present. Assuming this is correct, the custody of the evidence (E) is transferred to the custodian of the evidence locker (203) who will store the evidence (E) until it is needed.

Once the evidence (E) has been placed in centralized storage (203), the handheld computer (103) can either have its memory deleted, freeing up space for the next investigation, or may maintain a duplicate record of the evidence entries for continuing investigation. Generally, the handheld computer (103) will retain a copy of the record (to allow for updating) until the record is purposefully deleted. Regardless of what happens, at this time the handheld computer (103) may no longer have a master record of the evidence entries. That will often be maintained at the central computer system (201). In an embodiment, the system (100) will utilize a hierarchical arrangement of information where the system on the central computer (201) is the highest in the hierarchy with other copies of the entries below it, however, the master record may be the record with the most recent or most current set of information or evidentiary findings, as defined by the most current time and date when any entry was engaged. In this way, records are updated to include the newest information regardless of where the information is entered.

Once the evidence (E) is in storage and the information is on the central computer (201), additional functionality may be provided. Specifically, the data is no longer unique to the original handheld computer (103) on which it was entered but is now placed centrally and can be accessed via any device (205) capable of accessing information on the network, including the central computer (201). It should be recognized that computer (205) will generally provide similar functionality to the handheld computer (103), but may provide consolidated or more detailed information in each screen due to a larger screen size. However, the general storage and access functionality will be similar to that shown in FIGS. 2-14. In one mode of operation, this will allow an investigator (I) in the field to add information to a specific open case they are working on by accessing the information. It may also allow for a new party to take custody of the evidence and attach further information to the evidence entry. To load existing case information the investigator (I) may utilize a list of cases such as the list (1803) in FIG. 18. Search capability can also be provided.

For example, when a gun's serial number is matched to an owner who is a suspect, the person who performs the match can provide the additional piece of information to the evidence entry for the gun and/or suspect. Similarly, if the investigator (I) was to locate and arrest a suspect in the case and the suspect had a firearm on them of a type which was used in the crime, the arresting officer may access the evidence entries of the case (310) from their handheld computer (103) and add the additional evidence entry for the gun to the record of this case (310). They may also add a picture of the suspect, for example, if one had not previously been part of the record. They may also do this directly from the evidence room (203) at the time the suspect is brought in.

This updating may occur in a still further embodiment by accessing the master file directly via a network connection of the handheld computer (103) or depending on functionality, the computer (103) or (205) may not access the master copy directly, but the computer (103) or (205) may be able to access the case (310) via a reference number or other identifier so that the new evidence (E) can be connected to the case (310) when the handheld (103) is allowed to update by being linked at a later time.

This last embodiment can be particularly useful in a situation where there is concern of the handheld computer (103) being used to obtain unauthorized access to certain information and thus the flow of data is designed to be more one directional. Similarly, in an embodiment, the device (103) can have access to software which can provide a remote kill, for example, where its memory can be deleted or its functionality can be destroyed by a remote action should the device (103) be lost or stolen. An investigator (I) who knows that there is an open case (310) can obtain the reference of that case (310) from the handheld computer (103), but cannot access the details of the evidence already collected. Instead, they simply enter their new details, and that information is allowed to flow to the central server (205) where it is connected with the already open case (310).

To access and add to information on a case (310), the investigator (I) may have access to all cases on the central computer (201) via their handheld computer (103), or may have access to only those cases they have previously worked on or are specifically provided access to. The latter will generally be preferred as it helps to make sure that each investigator (I) is not overwhelmed with a long list of open cases when they are trying to locate the one they are investigating. However, it does not provide the ability for an investigator (I) to connect evidence to a case other than those they are working on.

In addition to providing all the above functionality on the handheld computer (103), the information may also be provided via the central computer (201) and via other computers (205) connected on a network to the server (201). These would generally be larger, more powerful machines, than the handheld computer (103) and could allow for the capturing of alternative data and for more powerful computational actions. In an embodiment, such systems (205) could be provided at the evidence locker, but could also be provided at remote locations, such as forensics laboratory or as part of a mobile command center.

Figures 18, 19:
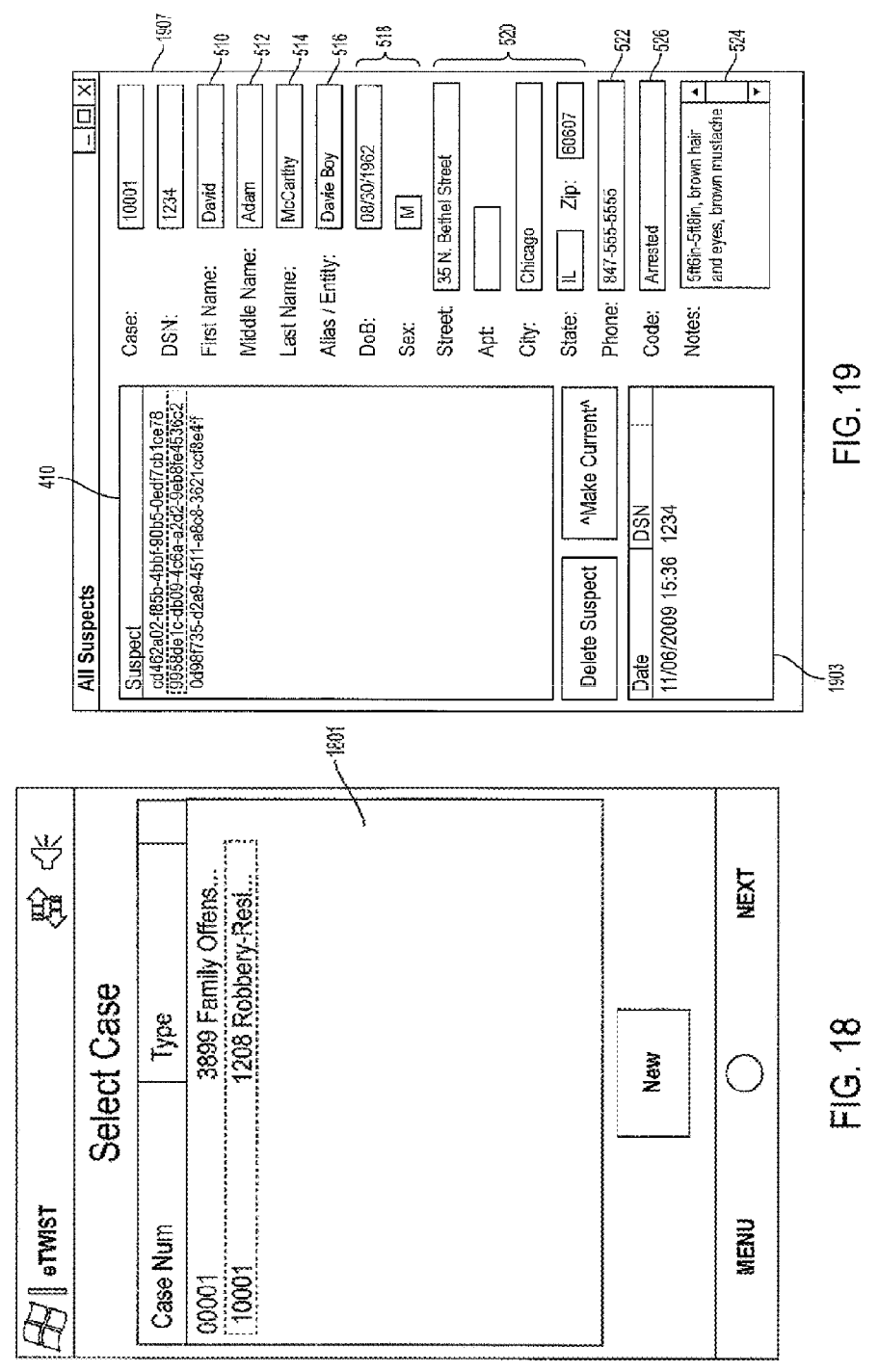

In effect, once entries have been uploaded from the initial gathering activity to the central computer (201), the accessibility of the evidence entries will generally increase as the information is moved from a single handheld computer (103) under the control of a single investigator (I), to a network accessible by many. This upload corresponds with the physical evidence (E) being made similarly accessible with the evidence (E) going from being at the remote crime scene, to being stored in a centrally accessible evidence locker (20) with such central storage, an interested investigator may be able to review the evidence entries and provide updates or connect them with cases. FIG. 19 shows a screen (1404) which provides the suspect list (410) in a case. In FIG. 19, the information generally available to the investigator is the same as that of FIGS. 4-5B, but is provided in a larger more complex form, as computer (205) may have a larger display, more powerful processor and increased or simplified data entry tools. The screen (1901) also indicates the investigator (I) (1903) who entered the information.

Generally, once the evidence (E) has been placed in the evidence locker (203), the handheld computer (103) on which it was originally entered will not be used in conjunction with it anymore. Instead, a user who is accessing the evidence (E) would use one of the remote terminals (205) to scan the evidence (E) in or out. Further, that user may enter additional information for the case (310). For example, the user may perform a ballistics analysis of a firearm. The results of that analysis may be added to the case file for that firearm as additional evidence. This will work whether the additional information is physical or is electronic.

Figure 20:
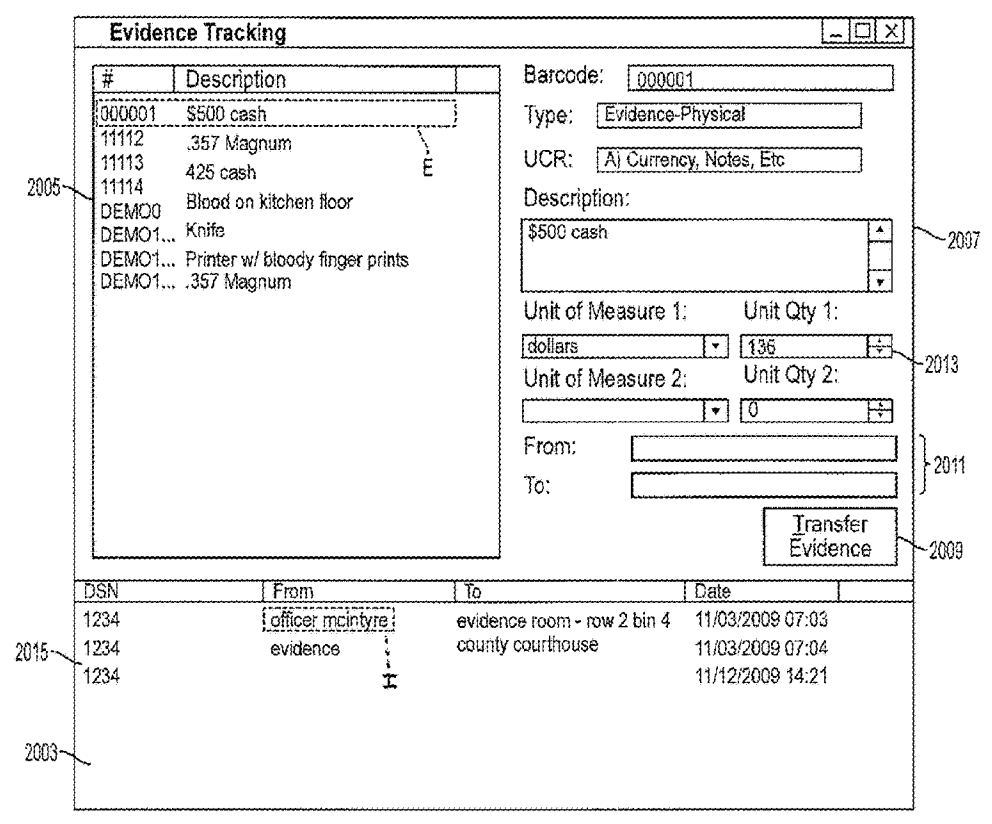

While computer (205) may be used instead of computer (103), the functionality of the device (103) in connecting the chain of custody is still maintained. Specifically, when a user wishes to obtain or check out a piece of evidence (E), they will essentially go through the same process investigator (I) used to initially set up the evidence (E). When they go to obtain the evidence, they will obtain the bag (1702) with the evidence (E) they want by looking it up on the central computer system (201). They will then obtain the bag (1702) which will be checked out to them. FIG. 20 provides for an embodiment of a screen used on a remote computer (205) or central computer (201) showing a transfer to a new individual. The listing (2003) shows the current chain of custody with the evidence (E) having been passed from the investigator (I) to the evidence room and having been checked out from the evidence room to the courthouse. Listing (2005) provides for the evidence associated with the selected case and checkout section (2001) provides for the checkout details to be entered. In the depicted embodiment, the checkout section allows for a partial checkout, as indicated, where a unit (2013) is less than the entire available. To check out the evidence (E) a user would enter the checkout "From" and "To" fields (2011) and then indicate the transfer is to occur using button (2009). As can be seen in FIG. 20, an open entry is already prepared for the forthcoming transfer showing who (2015) performed the transfer.

When evidence (E) is taken to the lab or wherever they are to work on the evidence (E), the user may verify the contents of the bag (1702), match the label (1701) and will perform whatever tests are appropriate. The test results can then be entered into the same system (205), or can be connected to the piece of evidence (E) utilizing the tag number (1515) or (1535) or other interconnection if legacy system interoperability is necessary. The evidence (E) will then be checked back in again verifying that the bag (1702) includes the items identified on its label (1701) and that the bag label (1701) matches the bag (1702) originally checked out.

This process can repeat however many times is necessary to test the contents of the bag (1702). As should be apparent the chain of custody can be made more robust by the various computer automated checks performed during the process. Specifically, as the tag (1701) and bag (1702) all include computer readable indicia, the indicia can be matched by machine eliminating the possibility of human error in writing down the identifiers. Further, as the evidence (E) is identified by tag (1501) or (1503) and the tag (1501) or (1503) is connected to both the bag (1702) and the specific case, it becomes increasingly difficult for a mistake to be made which associates the item with an incorrect case.

It should be recognized that one of the key purposes of the chain of custody is to limit the possibility of evidence being tampered with and, if facts arise indicating that tampering may have occurred, to try and narrow down who may have committed it and what effect it may have had. Effectively, by knowing who has the evidence (E) in a checkout and who performed (2015) the checkout, you know who has the opportunity to tamper with or modify the evidence (E). Thus, should $100 be placed into evidence, and 6 months later it be discovered there is only $50 present, the people who had access to the bag (1702) and could have taken the other $50 is generally known. Further, as the evidence (E) is generally checked every time, should the error be detected, generally working backwards provides the most likely culprits in the modification.

While it is impossible to prevent individuals who are working with the evidence (E) from trying to defeat the system (100), or from tampering with the evidence (E), systems (100) generally reduce the ability to do so. In prior systems where identification was more manually intensive and relied upon physical signatures and the like, it was easier for an individual to forge credentials or provide false information. Further, as such chain was more prone to mistakes, the robustness of the system could fall into question even though the chain of custody was secure. For example, a reversal of two digits in writing down an evidence bag number may not be noticed until much later. When noticed, this could call into question if the right items was reviewed even though the nature of the mistake indicates that it is unlikely.

Further, once the evidence (E) was in the hands of a potential culprit in tampering, it could be a relatively easy matter for them to tamper with the evidence (E) without detection. Effectively, in a traditional system a piece of evidence (E) may be limited by description. Thus, if the description simply stated that the object was a stack of $100 bills totaling $1000 tied with a string, somebody may be able to come in and substitute some or all of the bills with other bills, modify the string holding them, or otherwise tamper with the specific items with a relatively low chance of detection.

The present system provides for improved chain of custody as it provides for an increased number of hard to forge elements all of which must be foiled to tamper with the evidence (E). For example, in the above situation, the presence of photographic evidence associated with the physical evidence can reveal specifics not reported, e.g. the serial number of the top bill, the color of the string, and the type of knot used in the tie. Still further, the connection with the tag (1501) or (1503), which is designed to be hard to remove and to indicate that it has been removed can further make such tampering difficult as the tag (1501) or (1503) would have to be duplicated and placed in the same position (as again indicated by photographs).

In addition to providing for a more robust system by simply providing more information connected with the evidence (E) to help show its uniqueness, it is also possible in the system to provide for hidden information which can be used to further insure that tampering is detected and thwarted. In a simple example, a person checking out the evidence (E) may not have access to the original evidence entry on the computer system (205) made by the investigator (I). Because of this, they may not know what photographs were taken or what additional information may be known about the evidence (E). They are simply presented with a raw specimen. This can make it more difficult for them to get all details correct if they are attempting to tamper with the evidence (E).

In order to still further improve upon the chain of custody, in an embodiment the present system provides for a background recording which is used to show all changes that have been made to the electronic records, the time they were made, and who made them as well as any other desirable system function such as the terminal (205) used or the location of the computer (103). As should be apparent from the above, one of the strengths of the system is that it allows for corrections and modifications on various pieces of evidence (E) over time. Thus, reports and analysis results can be done and connected with the evidence (E), further if additional information is known (e.g. another suspect is added) the information can be updated to allow it to remain current and useful for investigators.

The ability to modify, however, does introduce the ability to tamper. For example, a user can originally state that a package of money had $100 and then alter it later to say $50. If no other person had yet checked the number of bills present, it is impossible to know for certain which amount was actually found. The system deals with this by recording changes made, by whom (that is via who's account), and when the change was made. Thus, should an individual check out a particular evidence bag (1702) and then return the bag (1702) with an indication that a piece of evidence was destroyed by testing and no longer in the bag (1702), the time and date of that occurrence is recorded. Thus, should such change be added at a particular time, and that time correspond with the time that the results of such a destructive test be added to the evidence, the modification is probably legitimate. If such change occurs without support supporting the reason why, then the change may be suspect.

Similarly, should an individual decide to alter an amount of money in the bag from $100 to $50 the time and date of that modification is also recorded. While the above may be carried out for legitimate reasons, the idea of recording the occurrence of change provides that the changes will need to be explained and should make it more difficult for tampering to occur.

For example, if a user originally enters in the field that there is $1000, but when the evidence is checked in the next review shows that there is only $100, the reason may be as simple as typographical error. However, the issue may also be that someone has taken the other $900 and a flag may be indicated for review. Obviously, the presence of other identifying information (e.g. the photographs taken of the evidence) can further verify one story or the other.

Obviously, no system can completely prevent the misbehavior of the users tasked with using it. Should a user wish to steal from a stack of bills that is to be collected, they could always do so prior to the bills being entered into the system (100) at all. However, present systems also cannot deal with these problems and no technical solution can, as of yet, force individuals to behave in a certain fashion. One advantage of the present system, however, is that once the evidence (E) is in the system (100), the system (100) generally provides for a reduced possibility of tampering even by those purposefully trying to do so. Thus, from a legal admissibility point of view, the system (100) generally provides for a more robust chain of custody and provides for easier introduction of evidence (E) at trial, generally with fewer challenges.

At the same time, the system (100), by providing for a central repository of both physical evidence, and associated notes, observations, and other interpreted and photographic evidence, allows for more complete records to be maintained and searched. E.g. should a firearm be brought in, it can be possible to search all unconnected ballistics records to determine if the firearm was used in the commission of an, as yet, unconnected crime. Further, upon such connection being made, the central computer system (201) can indicate the connection and allow for evidence (E) to be listed in appropriate cases.

Still further, the connection of the various parts of the evidence entry at the time of the evidence entering chain of custody provides for an increased number of connections to help verify that the evidence (E), even in changing hands multiple times, is still the same item that was picked up initially and provides additional information which may not be available to connect to a case in present systems. Thus, the chain of custody not only gains legal strength but practically is generally better connected and serves as a more useful investigatory tool.

While the above has primarily focused on the system (100) as a system for the gathering and storing of evidence (E) to improve chain of custody from the crime scene (10) to the evidence storage facility (20), it should be recognized that the system (100) can also provide for powerful backend functionality which can assist in both the organization and operation of the evidence storage facility (20) as well as assisting with the investigatory work of the Investigator (I).

Computers such as computer (205) will generally be available at the investigatory facility (both inside and outside the evidence storage facility (201)) and may be placed on individual investigator's (I) desks or in other easily accessible places. Using these devices, the system (100) can be utilized as a method for searching, sorting, collating, or otherwise parsing evidence (E) in a manner that is useful for an investigator (I). It can also provide for logistical benefits for those that operate and maintain secure storage (203).

In this disclosure, the components of the evidence storage facility (20) and other facilities where computers (205) and (201) are located may be referred to generally as the back end facilities. In these facilities, the system (100) is no longer directly associated with the collection of evidence (E), as it was at the front end (that is, the crime scene (10)) of an investigation, but are now used to assist with various actions with regards to handling and working with evidence (E) that has already been collected.

Figure 21:
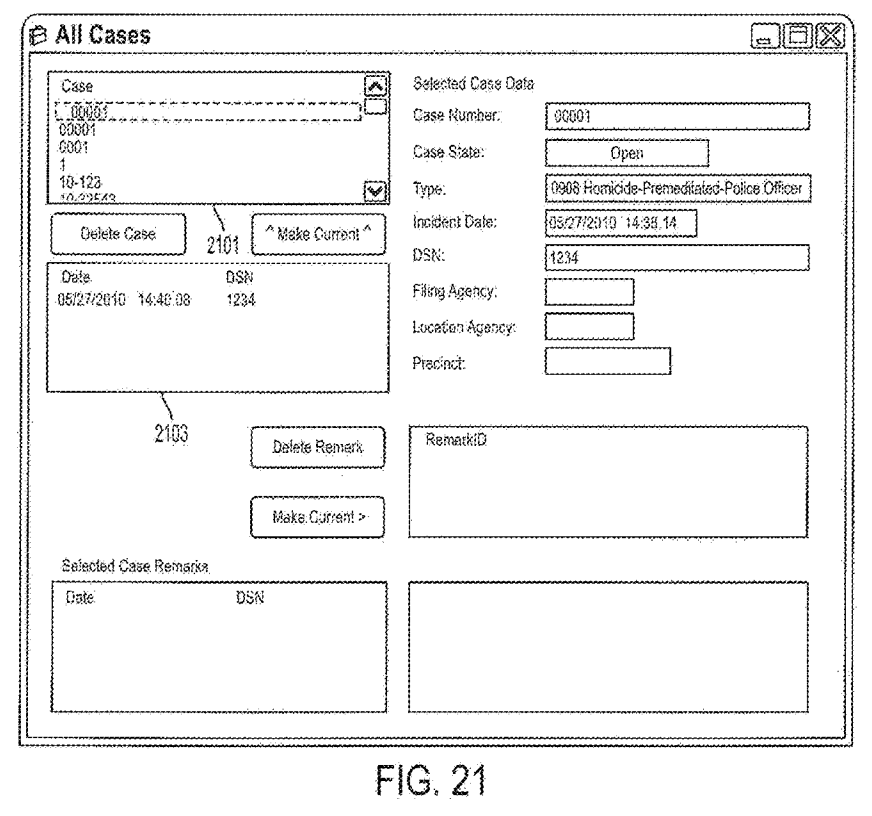

In the first instance, an investigator (I) can be provided with the ability to collate information from all the various cases by using a variety of search methods. While FIG. 19 has previously been discussed in conjunction with the ability to review suspects in a multiple of cases, it is not the only option. FIG. 21 provides a screen allowing the investigator (I) at a back end facility to review a list of cases (2101) and obtain general information about who created or opened cases and details of the case in the same manner as shown on the handheld device (103).

Figure 22:
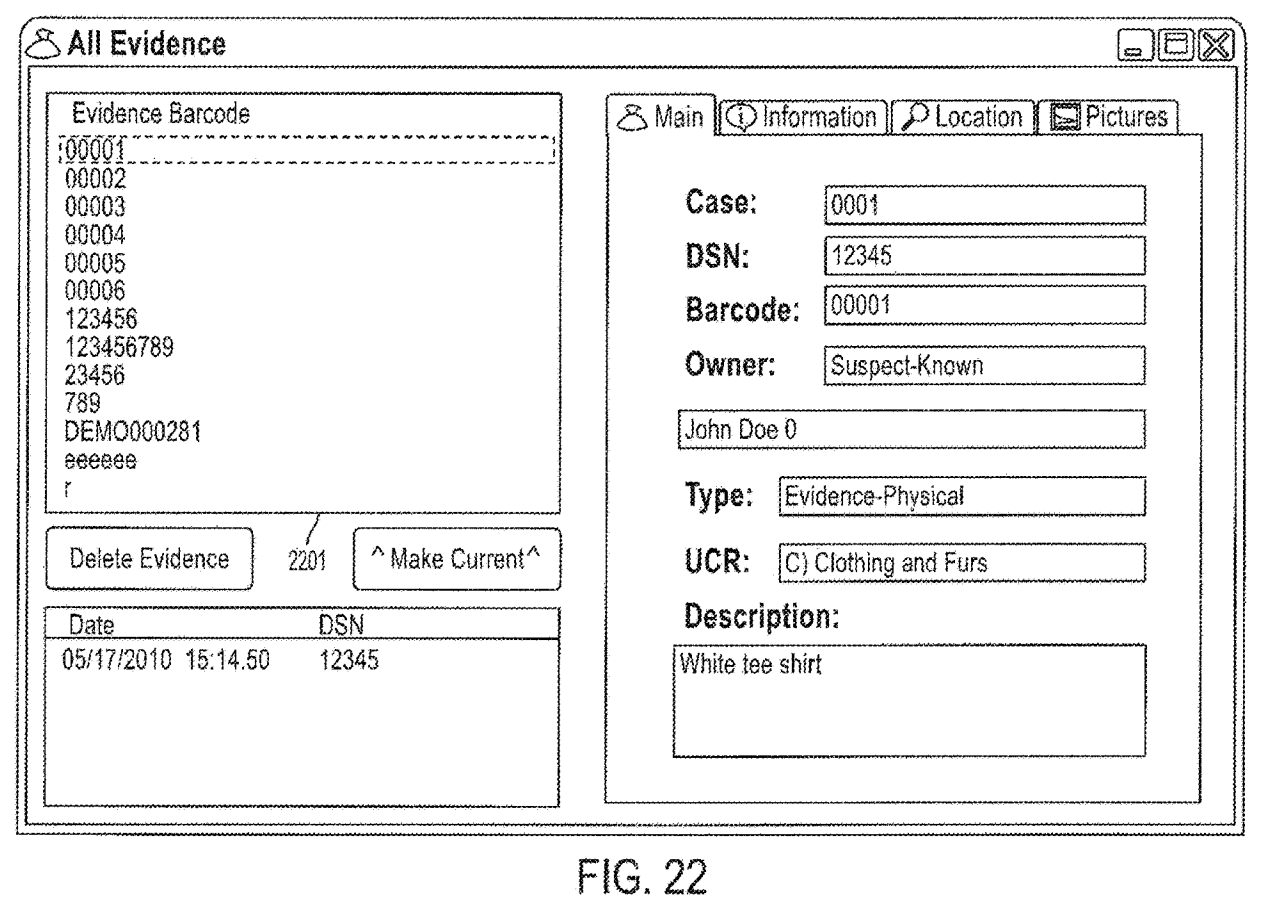

In a similar fashion, FIG. 22 provides for the ability to review outstanding evidence from an evidence list (2201) presenting the evidence (E) by identifier. This ability can be particularly useful should an investigator (I) be interested in determining what a particular evidence bag (1702) or piece of evidence comprises. For example, should the operator of facility (203) locate a piece of evidence (E) which appears to be old and possibly should have already been destroyed, they can locate that particular piece of evidence (E) by its record and review the details of it to associate it with, for example, a case or particular investigator (I).

Figures 23, 24A:
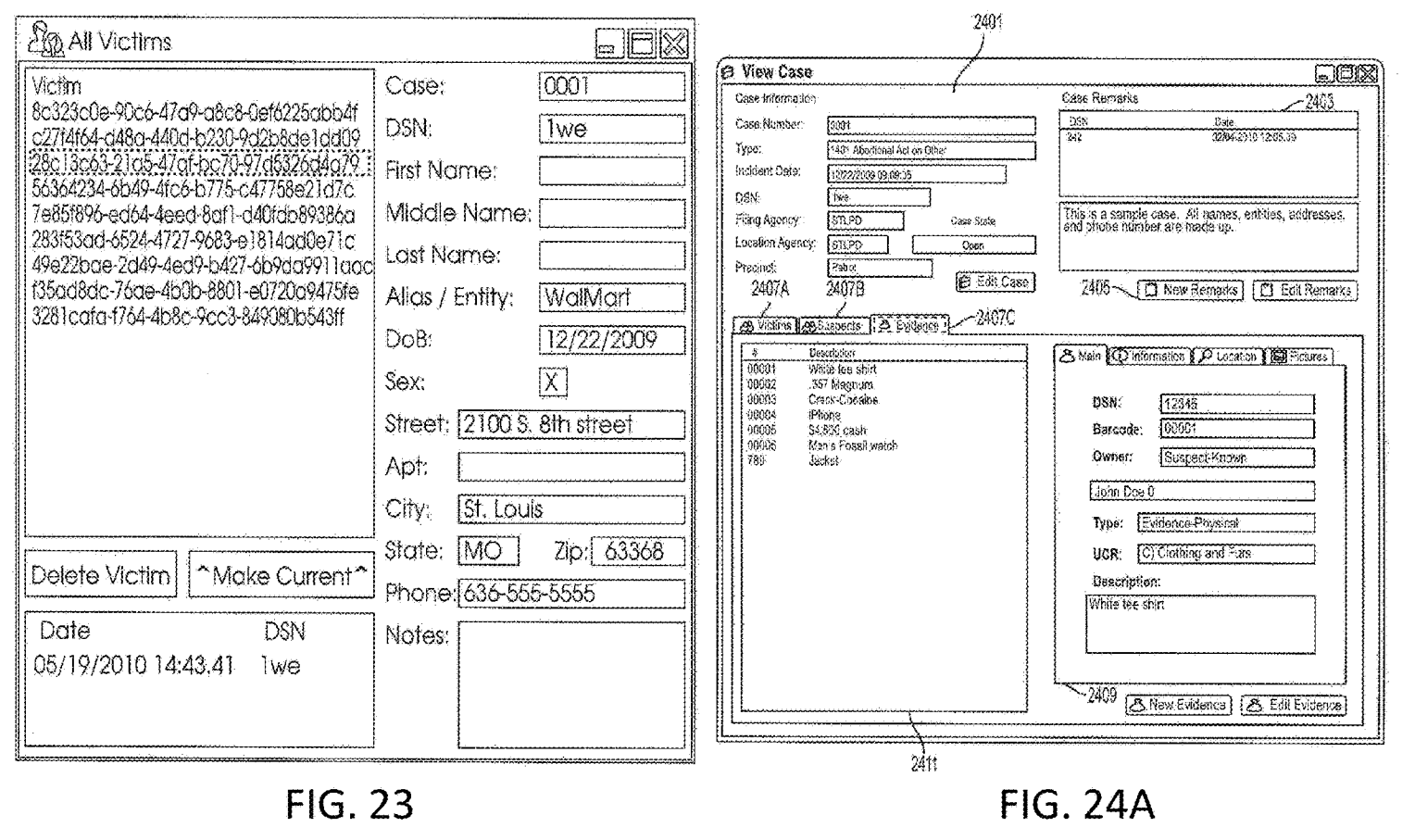

As should be apparent, as FIG. 19 discussed with suspects, it is also possible to provide a list of victims (2301) as indicated in FIG. 23.

While the above can be useful for investigatory work, they will often require a knowledge that a certain piece of evidence (E), suspect, victim, or case is present on the server (201) and now it is identified in order to be most effectively utilized. There may very well come a situation where an investigator (I) wants to know if a specific piece of evidence, or specific piece of information, is in the database but has no knowledge of the specific identifier of the evidence (E) or to what it may be associated. For example, if the investigator (I) was investigating a series of related crimes, they may want to perform a search to determine if other similar cases are listed but which have not been connected with the present ones.

Figure 25A:
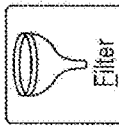
FIG. 25A shows a case filter screenshot.

FIG. 25A provides for a case list that allows for the activation of a filter (2501). Being able to view cases that have been filtered provides for the ability to make connections and to collate materials on the server (201) in a controlled fashion. Effectively, it provides an ability to efficiently search. In FIG. 25A, the filter (2501) may be setup to filter the cases in the case list (2503) by a variety of different methods. These include, but are not limited to, by incident date (2511), by date of last modification, (2513), by case number (2515), by type (2517), by DSN (2519) of the investigator (I), by the state (2521), the filing agency (2523), by the location agency (2525) or by the precinct (2527).

Figure 25B:
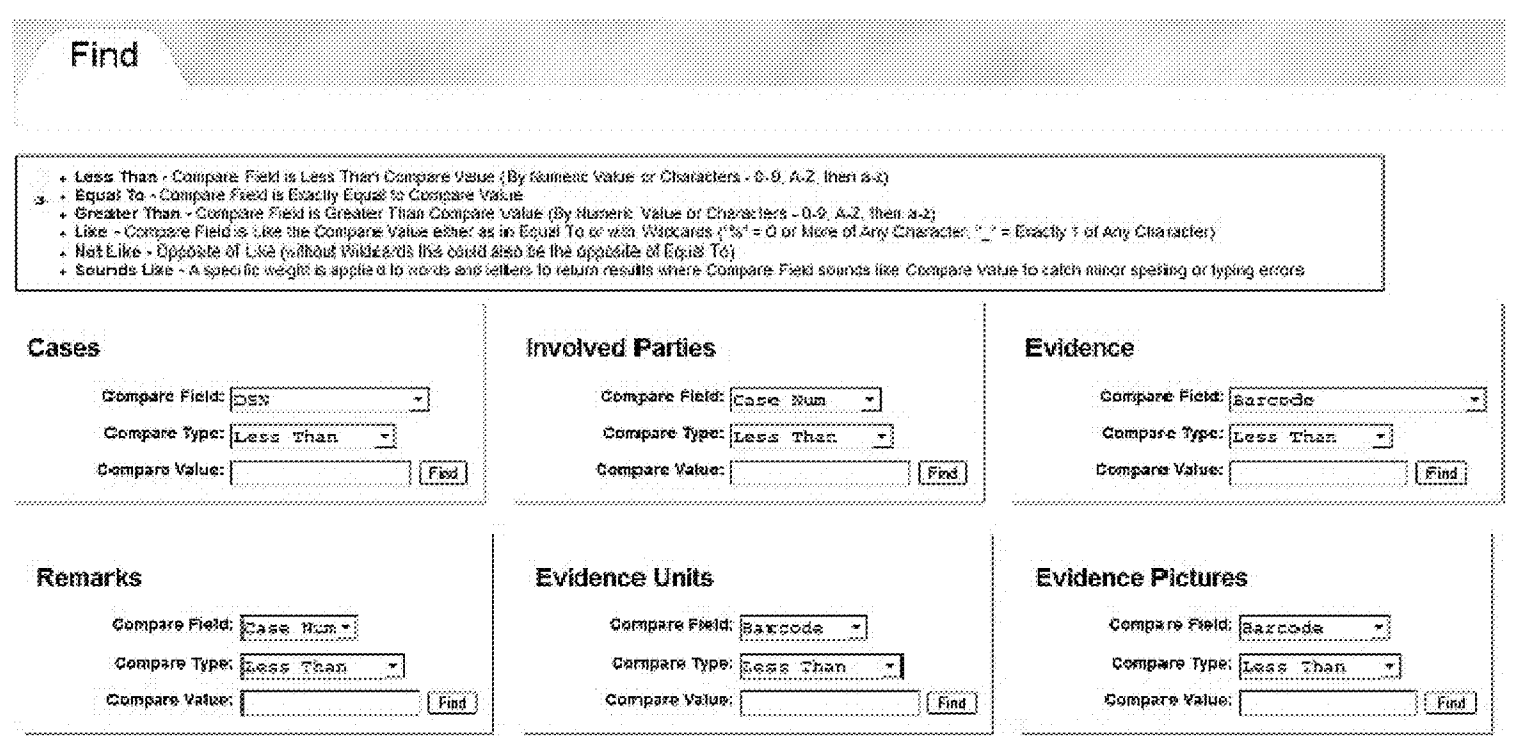

Use of a filter in order to perform searches or to provide for a specific subset of data is well known and an investigator (I) would be able to gain the expected benefits from being able to filter results and examine subsets. Specifically, the Investigator (I) could review their cases or cases of another investigator (I), review cases of similar types to look for trends, or even to search for a specific case based on known facts or pieces of evidence (E). Multiple filters can be used for the searches, preferably using multiple screens for the handheld computer (103) while all of the filters could be viewed on a single screen with desktop computers (205) as shown in FIG. 25B. Also, the search requests and filters can be formed using several optional logical operations as also shown in FIG. 25B and listed in the table of logical operations.

| LOGICAL OPERATIONS TABLE | |
|---|---|
| Less Than | Compare Field is Less Than Compare Value (By Numeric Value or Characters - 0-9. A-Z. then a-z) |
| Equal To | Compare Field is Exactly Equal to Compare Value |
| Greater Than | Compare Field is Greater Than Compare Value (By Numeric Value or Characters - 0-9. A-Z. then a-z) |
| Like | Compare Field is Like the Compare Value either as in Equal To or ',' ,'ith Wildcards ("%" = 0 or More of Any Character, "_" = Exactly 1 of Any Character) |
| Not Like | Opposite of Like (without wildcards this could also be the opposite of Equal To) |
| Sounds Like | A specific weight is applied to words and letters to return results where Compare Field sounds like Compare Value to catch minor spelling or typing errors |

It will further be appreciated that these logical operations can be varied for each one of the fields that is being searched by the filter.

Figures 24B, 24C:
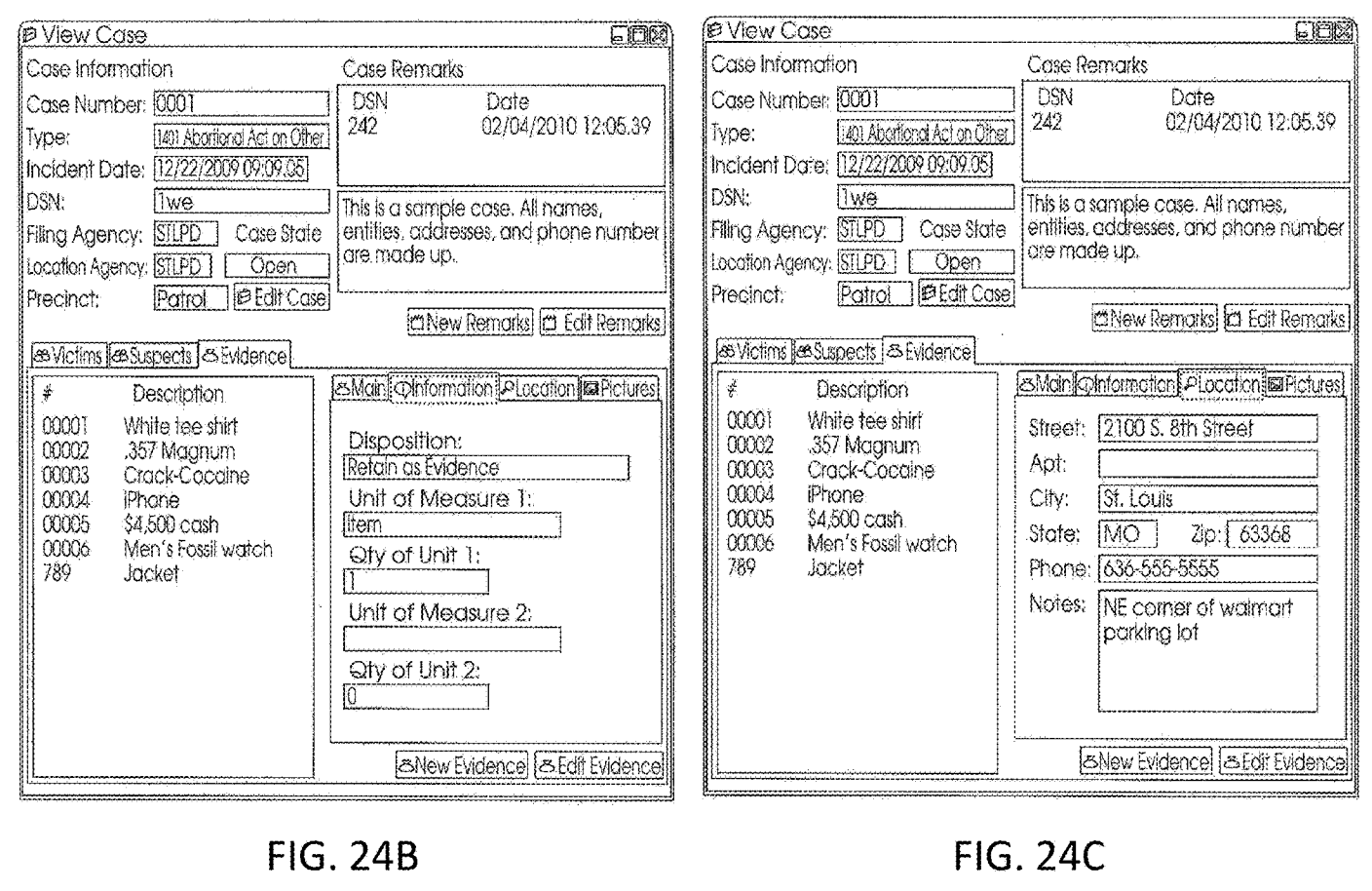
Figures 24D, 24E:
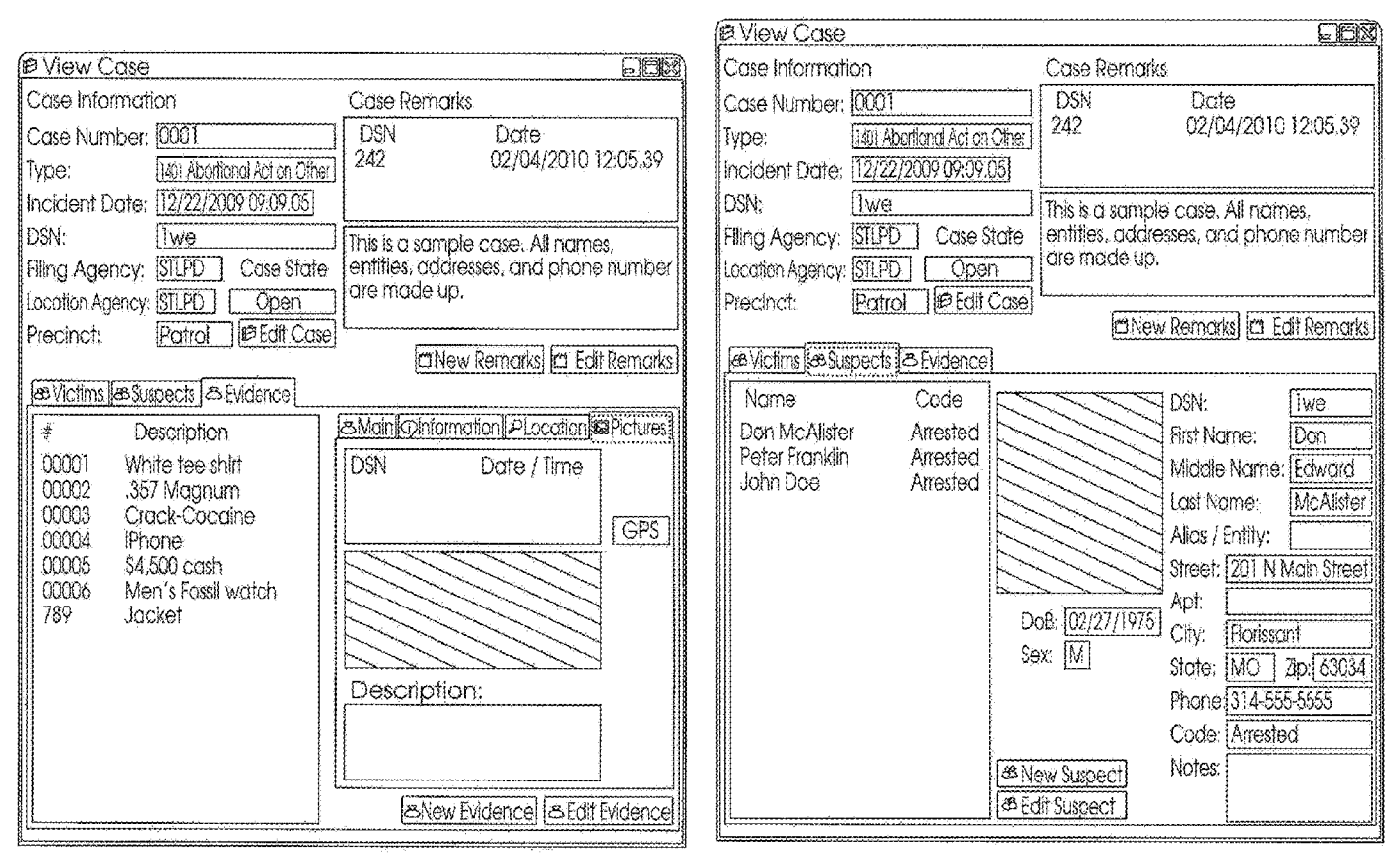
Figure 24F:
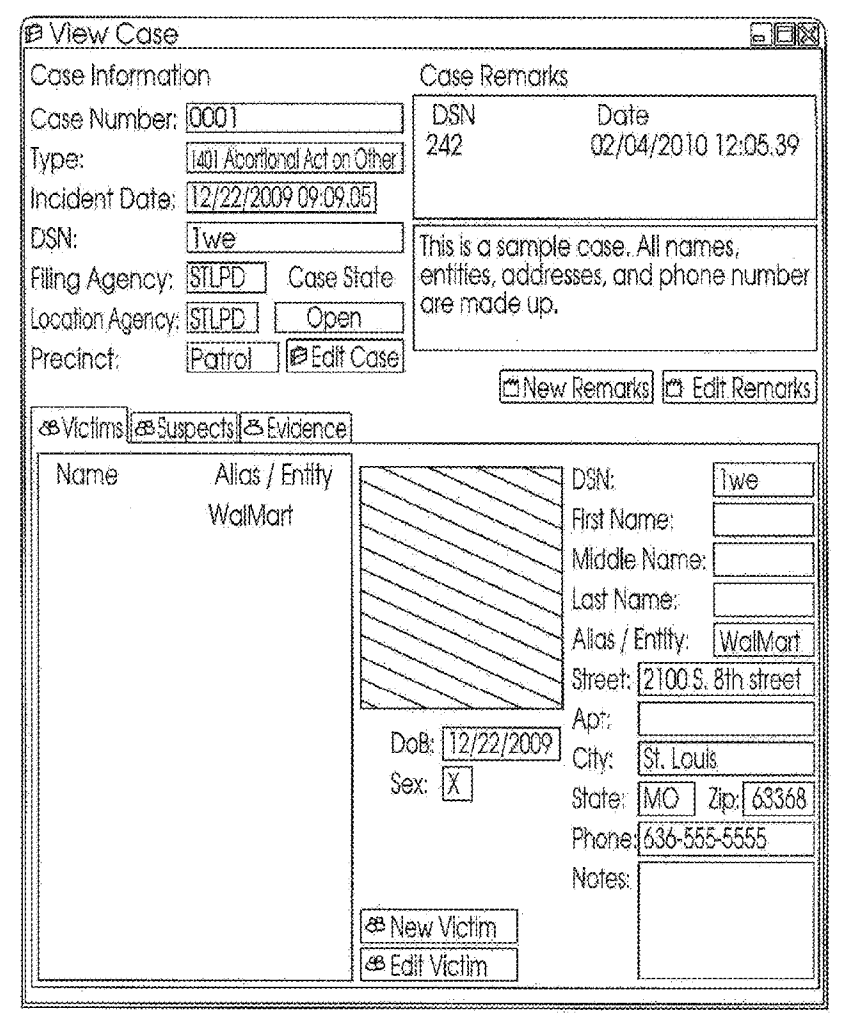

When reviewing a specific case, the system (100) will generally provide for ways to review all the information associated with that particular case in a coherent fashion. In this way an investigator (I) can review all evidence (E) associated with a case. The screens of FIGS. 24A-24C provide for an embodiment of a display that can be used to provide the information for a sample case. As should be apparent from the figures, the specific case view shows the case information (2401) for the case being viewed. The case view also shows a listing of all the remarks attached to the case (2403). These may have been generated in the field using the handheld computer (103) or may be added or edited in the case view of FIG. 24.

Attached to each case are tabs or folders (2407) which provide for the various lists of victims (2407A), suspects (2407B), and evidence (2407C) to be switched between and viewed. As can be seen in the various views of FIG. 24, the details of the information that was entered with the evidence collection at the crime scene (10) and disabled in FIGS. 10-13 is visible in area (2409). Generally as a piece of evidence (E) (e.g. white T-shirt (2411)) is selected, the information displayed in area (2409) will change. Further, as is illustrated in FIGS. 24A through 24D, the area (2409) may include additional tabs (2413) for different pieces of information about the particular evidence (E) selected allowing general access to the collected and entered information.

It should be apparent from the above description that once the information from the handheld (103) is uploaded to the server (201), the information does not remain static and may be used and manipulated by the investigator (I) both in ongoing investigations, or to obtain information from cases which are closed.

While the above components of the backend have focused on the ability to review existing evidence (E) information, in many cases, the case will eventually be closed. When this happens, it is important to make sure that the case records, and the evidence (E) associated with the case, are properly handled. In some cases, evidence (E) may need to be maintained in long term storage essentially forever (or at least until all parties involved in the case have died). In other circumstances, long-term storage of evidence (E) may be undesirable (for example, because it presents a biological threat or because it takes up too much space) and the evidence (E) will need to be destroyed or otherwise disposed of once it is expected to no longer be needed. One example could be a situation where the defendant has completed all available court appearances. In a still further case, the evidence (E) may need to be returned to an original owner, or may be sold to raise money for the investigating agency and knowledge of when such actions should be taken out are valuable.

Figure 26:
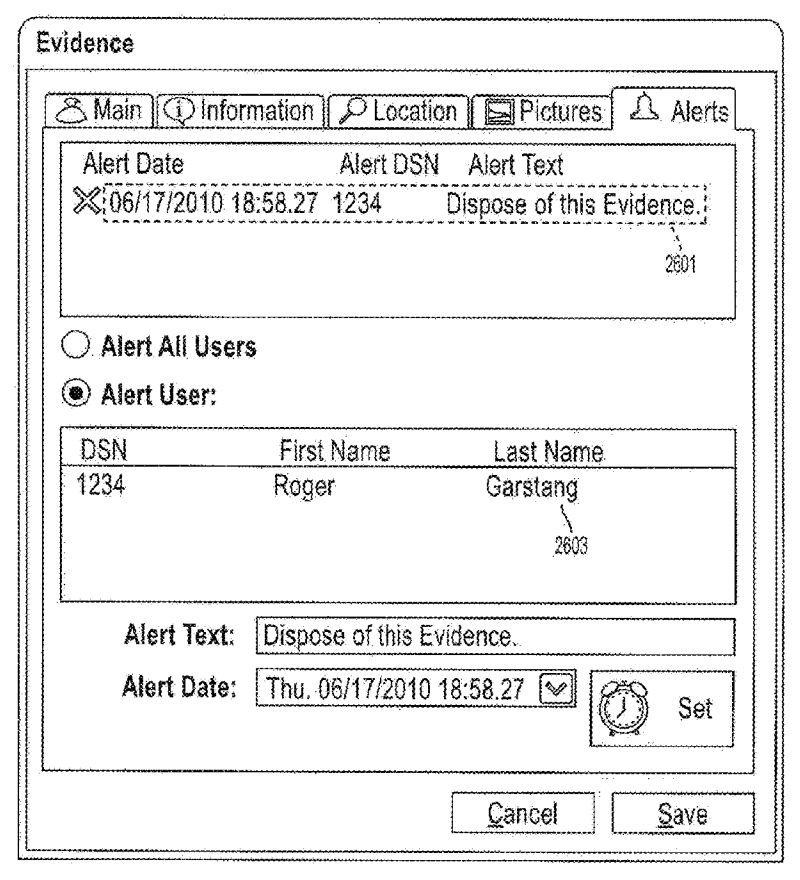

One ability of the backend system is to provide that the necessary resultant disposal of the evidence (E) can be entered when the evidence (E) is deposited at the facility (203) and alerts can be setup to indicate to an investigator (I), or any other party, that it is time to dispose of the evidence (E). FIG. 26 provides for an embodiment of a notification system by indicating a screen whereby an evidence alert (2601) may be created. The evidence alert (2601) will be associated with a specific piece of evidence (E) and/or with an evidence bag (1702) and will provide for an instruction as to what to do, and a date on which the alert becomes active. Thus, if a certain piece of evidence is to be disposed of 5 years after the case closes, the evidence alert (2601) will be setup to alert an individual (2603) responsible for the Evidence (E) at the desired time. This individual may be the Investigator (I), an individual responsible for the Evidence (E) storage, or any other person, as appropriate. Further, alerts can be simultaneously sent to multiple individuals if that is desirable.

Once the alert has been set it will operate in the background until the appointed time when it triggers. Alert notifications may be provided in any fashion but will generally utilize electronic communication methods such as, but not limited to, sending email or providing an alert notification through the system (100). FIG. 27 provides an embodiment of an alert reminder (2701) which may operate through system (100). When triggered, an alert reminder (2701) is provided to the appropriate individual telling them that a piece of evidence (E) needs to be dealt with and how to deal with it. Generally, this individual, upon receiving the alert (2701), will either deal with the evidence (E) as indicated or put the alert in a sleep mode. If they deal with the evidence (E) as indicated, they would mark that the alert (2701) has been completed (2703). If the individual does not currently have the time or desire to complete the alert, or if they feel that the Evidence (E) needs to be retained for a longer time for whatever reason, they may instead choose to set a reminder to close the alert but have it return at a later time. This may either be a short term sleep (e.g. if they got the alert (2701) at or near crime scene and wanted the alert (2701) to reappear when they returned) or may be a longer term delay (for example, if an appeal is still pending).

Figure 28:
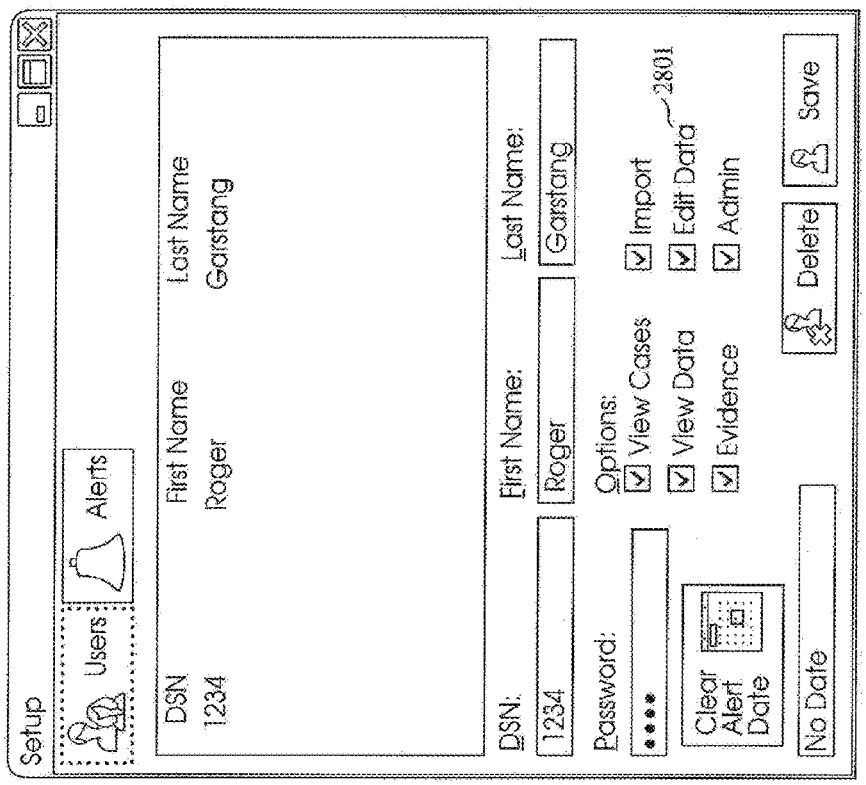
FIG. 28 shows a screenshot of a user setup and maintenance screen.
Figure 29:
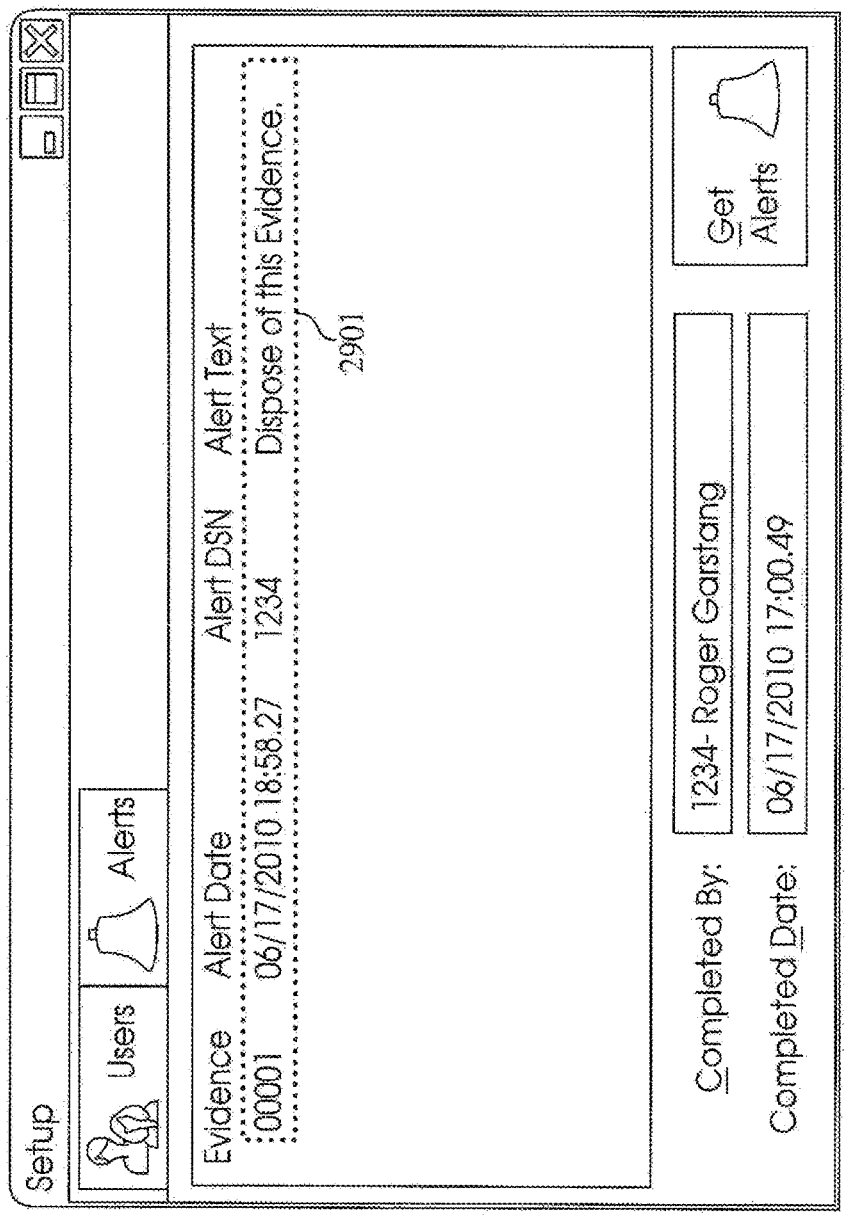
FIG. 29 shows an alert record screenshot.

It should be recognized that because the system (100) operates with potentially sensitive data, user control is desirable. FIGS. 28-29 provide for general administration of investigators (I) on the system and their access. In particular, the investigators (I) may be added and provided with various abilities (2801) including the ability to view, edit, and access various types of data. In this way, investigators (I) with different areas of expertise and need to interact with the system (100) can be provided with access appropriate for their expected use. This type of central control to setup and control users will generally be provided only to certain administrators to provide for further enhanced security in the system and, as discussed previously, all changes may be recorded.

As part of the user setup and monitoring, it may also be possible for an administrator to view the alerts (2901) of investigators (I). In this way they can verify that the investigator (I) is actually completing alerts (and not just putting them off) and should a piece of evidence (E) have been disposed of which is later needed or where there are questions as to the disposal, they can review the alert specifics to make sure that standard protocols were carried out.

As indicated above, multiple investigators could be working on the same case or and there can be overlap of investigators on groups of cases. Therefore, it is possible that two or more investigators try to enter evidence entries at the same time using two separate handheld devices (103). Even though most close-in-time entries only appear to be simultaneous, even if they are simultaneous, the central computer will select one entry to process before another entry and each sequential entry gets a consecutive transaction number which uniquely identifies the timing of each entry relative to the other entries that have been processed by the central computer. In FIG. 30, a chain of custody report illustrated the sequential transaction numbers for several evidence entries. The timing of the initial processing of each of these entries by the central computer determines the order of the transaction numbers. Therefore, the central computer is the final arbiter of the timing of the entries and the corresponding sequence numbers, even if some entries are modified at a later time or the local time of the clocks of various investigators' handheld devices are different, such as when investigators are located in different time zones.

The transaction number is a consecutive ID number assigned within the eTWIST® database to help or further indicate the order in which a respective Transaction for a piece of Evidence occurred within the eTWIST® system. Should the internal clock and/or calendar of the computing device, be inoperable, become inoperable, malfunction, set incorrectly or otherwise function in a manner that may reflect the exact same time and/or date as another computing device, the Transaction Number provides system generated ID as the transaction occurs in the system. Accordingly, the central system protects against having two transactions occurring at precisely the same time.

The transaction number is particularly helpful because of the real time data sharing of evidence that the present invention provides to users, including the ability to import and export evidence data entries. Multiple users from multiple respective agencies, FBI, DEA, ICE, and local police departments can all be collecting, documenting, photographing, and entering data on the same case at the same crime scene, such as a drug seizure on a border. Also, the present invention permits investigators to enter data from separate crime scenes in different parts of the country, such as the 9/11 attacks in New York City, Washington, D.C., and Pennsylvania or around the world, such as multiple IED explosions in Iraq and Afghanistan or tsunamis in Japan and Singapore. The evidence transaction history maintained in a manner that provides for multiple people editing or adding to the exact same data in the same case then uploading the edited data. The database also tracks and maintains additions and edits by multiple users. It is possible for multiple central evidence systems to correlate the timing of their entries based on Greenwich Mean Time (GMT or "Zulu" Time) and each central evidence system may also have a unique identifier for any records that are compared or shared with other systems.

As indicated above, the mobile device (103) can communicate with other devices, computer networks or other investigatory tools. Although current sampling devices perform a sampling of ambient conditions for themselves and obtain their location from a GPS module, these sampling devices do not permit two-way communications for searching existing evidentiary materials as generally explained above for the present invention or for communicating with other computer networks or investigatory tools to obtain information that has already been collected from other devices, some of which may be on other evidence management systems or investigatory tools that are connected to the investigator's local evidence management system through computer networks (104).

Figure 31A:
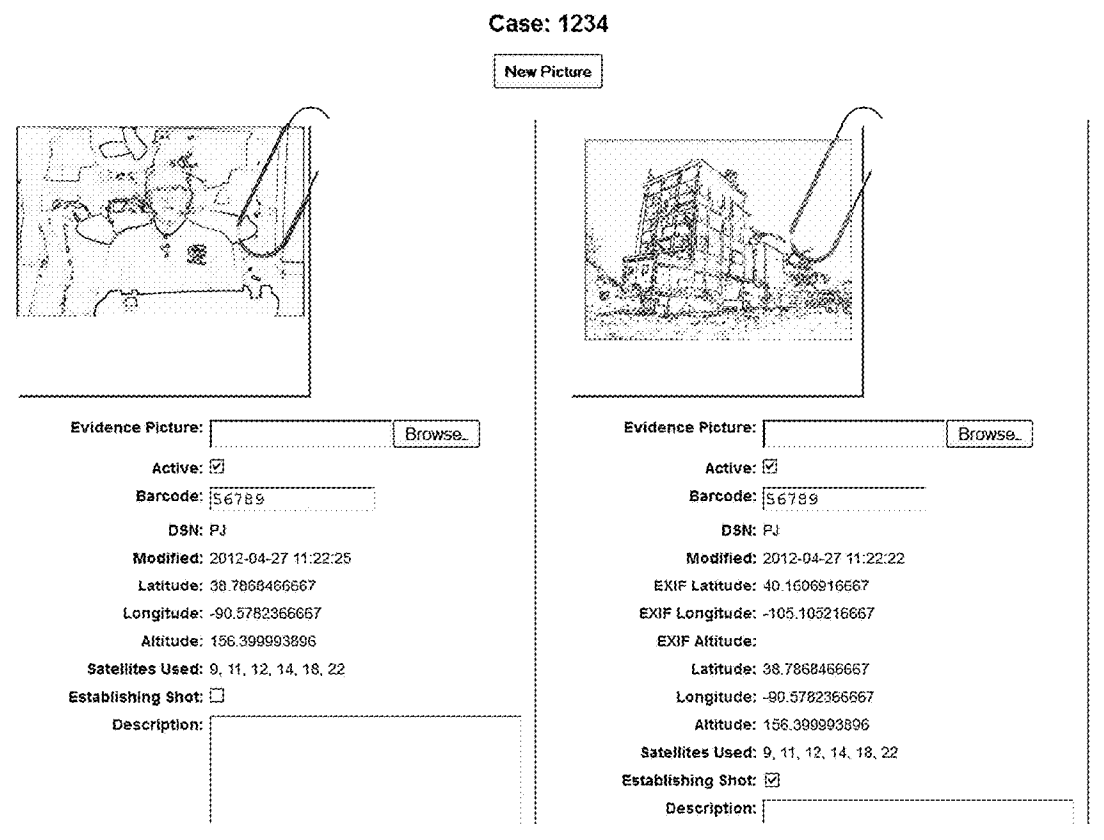
Figure 31B:
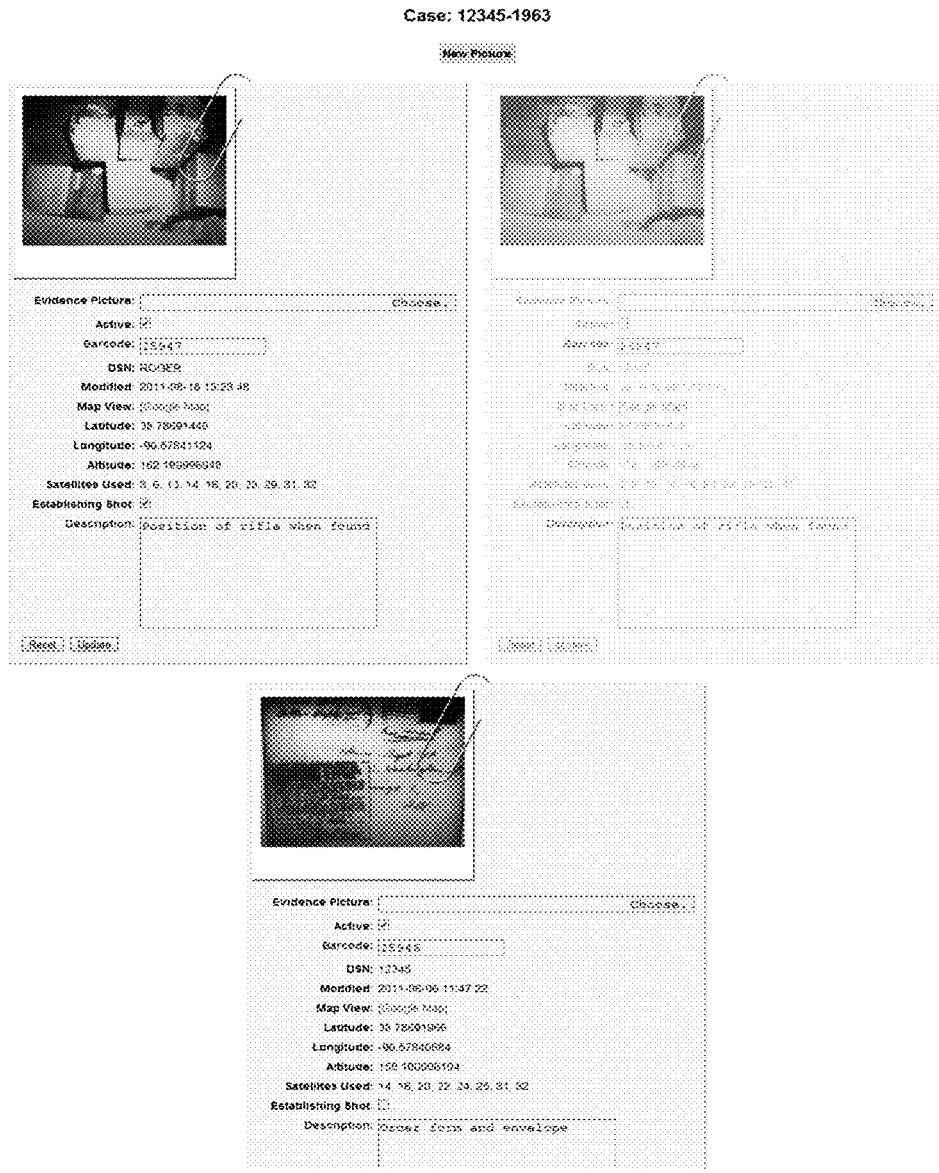

As another way to help manage case files, the present invention provides investigators with a way to identify one of the photographs as an establishing shot of a crime scene or some other place or object of interest in the investigation. All other photographs in the case can be referenced and evaluated relative to the establishing shot. Accordingly, as shown in FIG. 31A, the establishing shot: is generally used as the base or beginning/starting photograph or video recording of a possible or actual crime scene or investigation, as a whole or in part, or as the base photographic or video recording or a combination thereof, used in the gathering/recording/recordation of possible respective piece(s) of evidence. The base photo helps to establish, represent, relate, or otherwise depict where all other respective photos/videos can or may be evaluated or referenced back to. The establishing shot can be an overall view of a location such as shown in FIG. 31A or a more specific picture of a specific crime scene such as shown in FIG. 31B.

In the preferred embodiment, the physical evidence has a case correlation and also includes internal information for camera locations for a set of physical evidence pictures. The physical evidence screen provides the investigator with a selection option for identifying an establishing shot picture a set of physical evidence pictures. The computer processor uses the camera location corresponding with the establishing shot relative to the other camera locations that corresponding with the other physical evidence pictures and determines location references between the establishing shot picture and the other physical evidence pictures.

The establishing shot may include: time/date recordation, personal identification of photographers/videographers/operators/handlers (including non-human), an individual, unique or respective identification of the photograph or video recording or device(s), (i.e. picture numbering sequence, SD card serial no., camera serial no.) infrared depictions, thermal depictions, multi-spectral images, angles, altitudes/heights, distances, compass heading/location of the recording device, the compass heading in relation to where the photograph/video was taken, atmospherical readings, (i.e. barometric pressure, humidity, wind direction and speed, dew point and UV index) or other unique or respective data points as may be available to photographers/videographers/operators and to the photographic and/or video recording mobile device(s) or equipment.

External environmental attributes such as, precipitation, rain, standing, running, flowing water, snowing or snow/ice covering, cloudy/overcast or sunny day. Internal environmental attributes such as, the physical state of the object being photographed or recorded, (burning/burnt, dull/shinny finish or texture, color of the object physical state of the internal location of where the evidence is found (i.e. painted, brick, plaster, glass walls), surface texture, physical makeup where the object was found (i.e. grassy areas, mountainous, desert, wooded/forested, regions, hard surfaces, rock drive or road, carpeted, tile or wood floor). Surrounding backgrounds (i.e. the front of a crack house during a winter snowstorm, surveillance photo of a suspected drug boat on the ocean at night or 3rd floor office suite, amount of leaves on trees, flow of a body of water, remains of a body, aftermath of a manmade or natural disaster, a measurement device to establish or give reference to the scale/size of the object).

The establishing shot is determined at the discretion of the investigators (photographers/videographer's/operators/handlers), where multiple pictures may be designated as an establishing shot and the establishing shot may be changed as warranted at the photographer/videographer's choosing. The Establishing Shot may be added from outside databases or sources by selecting the respective photograph or video recording from the appropriate database file, folder or hardcopy. Incorporating the "Map View" and the GPS coordinates of the establishing shot helps to plot and view the crime scene, evidence location and the visual path of the evidence, (flow or dispersion path of natural disasters, shell casings, blood splattering or police chase). Geo-Tracking of the Lat/Long/Alt/Satellites is captured and recorded out 9 decimal places after the decimal point (i.e. 158.100006104) providing a higher resolution and a more accurate enhancement of the evidence location/scene.

It will be appreciated that the establishing shot aspect of the present invention could be used with other mobile devices other than a handheld computer and could even be used at a stationary position. The establishing shot relates to evidence collection generally, by any means of accumulation, taken or gathered from many different and varying devices, all having some form of photographic/videographic recordation capabilities, contained in/on or as a separate but attached part of the device such as, Unmanned Guided Vehicles (106), whether deployed in an aerial mode (UAV), a ground mode (UGV), a water mode (UWV), subsurface vehicles, K-9 (non-human) mounted, or vehicle mounted.

Fixed Station photographic/videographic devices such a trail or pole/bracket mounted camera and/or video recorder. The establishing shot is not limited to only law enforcement personnel and may also be employed by Federal agencies or military photographers/videographer's/operators/handlers as well, in drones and/or robots whether aerial, ground, water, subsurface, or worn as part of a group or individual tactical deployment set or kit.

Figures 32A, 32B:
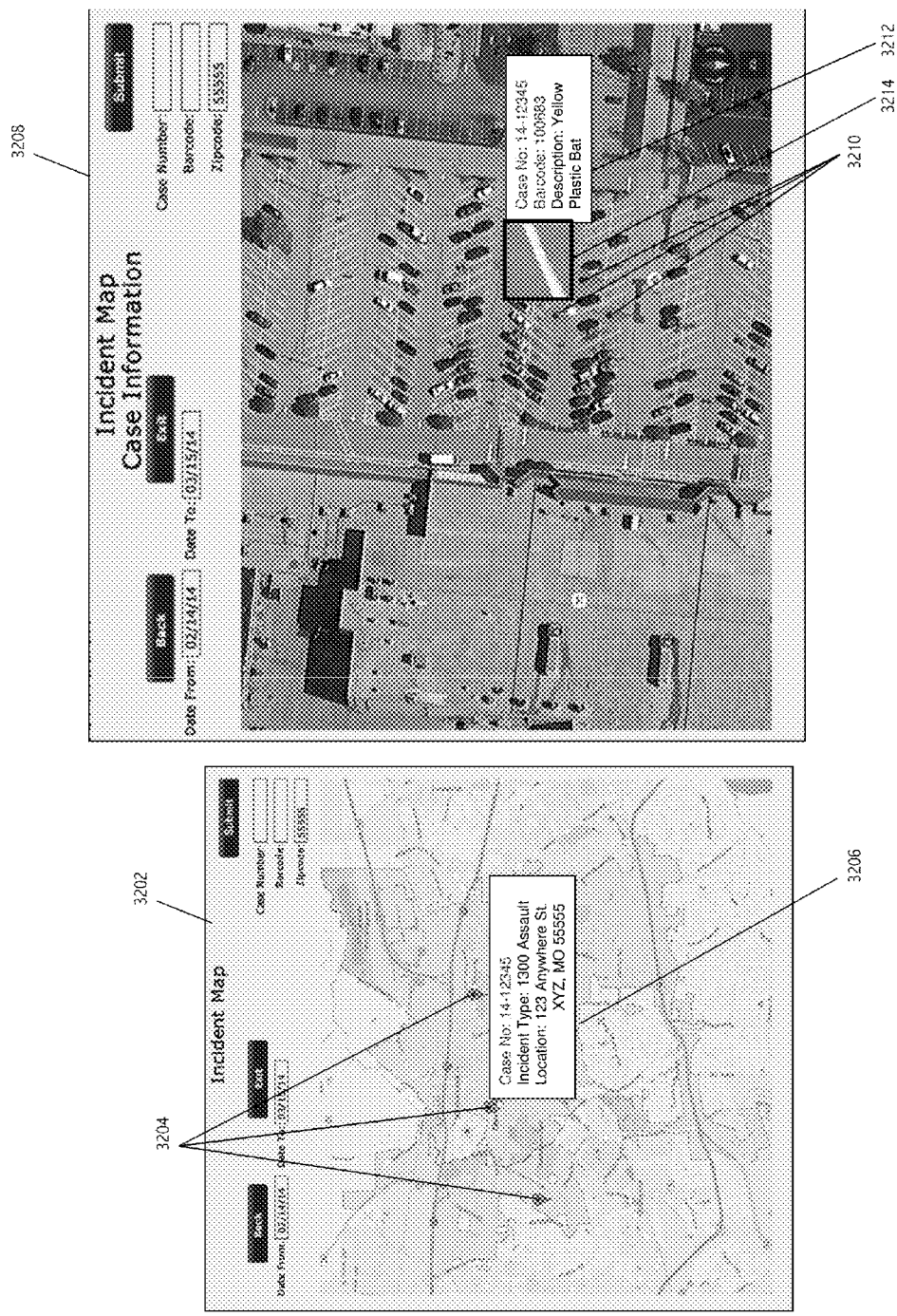

The locations corresponding to the establishing shot and related evidence and pictures can be stored in the database, tracked, and displayed on a map. As shown in FIG. 32A, an electronic map (3202) can be used to display the various locations of different incidents by overlaying incident markers (3204) on the map corresponding with one or more incident scenes. When a user identifies a location of interest on the map, such as by placing a cursor over an incident marker for a particular location, the system will respond by displaying some basic case information for the marked incident. For example, the system can display an incident text box (3206) next to the incident marker which provides the respective case number, incident type/NCIC code, and street location. The case identifier can be shown as a highlighted web link which can selected to bring the user to more detailed information about the case and the corresponding evidence. When multiple incidents occur in the same general area, the user can zoom into the map to more particularly identify a location of interest, and the text boxes help the user differentiate between different cases to identify the particular case of interest.

As with the other evidentiary information that is stored in the database, prior to displaying the location information, the system validates the roles, rights and/or privileges of the requester/user as assigned by the system administrator or other designated authority. Users are limited to their respective rights and privileges, which may include unlimited access, limited access or no authorization to access within the incident scene evidence mapping feature. All respective user level of access may be further restricted to respective evidence types, case types, time/dates, zip codes, or other privileges assigned by the administrator so that only incidents within a given user's parameters will be displayed and accessible.

The system provides the user with several optional entries that can be used either individually or together to select a set of incidents that the system displays on the map, such as a date or date range, a case identifier, an evidence identifier (i.e., barcode) or a geographic area which can be defined by a number of methods, including zip code(s), municipality borders, or any other region of interest. The user can enter more than one zip code, case number, and/or barcode either by typing or scanning in the respective data box followed by a comma, proceeding to the next respective requested data and so forth or by scrolling in the data box of the corresponding respective field, clicking on the desired data for the first choice, proceeding to all subsequent data selections. The user may select to exit out of the system or page back at any time within the operation by simply clicking on the appropriate button. The user continues to enter the information for the desired incident(s) until the all desired selection(s) are complete and then selects the Submit button. The corresponding evidence data is displayed on the Incident Scene Evidence Map (3202).

As indicated above, the user can select an incident marker on the map or a case identifier link within the display box, and the system responds by displaying a more detailed map or picture of the scene (3208) showing the respective locations of recorded evidence for the selected case. The user can zoom-in or zoom-out on the map or picture to reveal a more accurate placement of the respective piece(s) of evidence as recorded by the system. Each item of evidence can be identified by overlaying an evidence marker (3210) on the map or picture. When a user identifies an item of interest on the map, such as by placing a cursor over an evidence marker, the system will respond by displaying some basic evidentiary information for the marked item. For example, the system can display an evidence text box (3212) next to the evidence marker which provides the respective case number, evidence identifier, and a brief description of the evidence item. The system may also overlay an evidentiary picture (3214) of the evidence item next to the evidence text box.

Figures 32C, 32D:
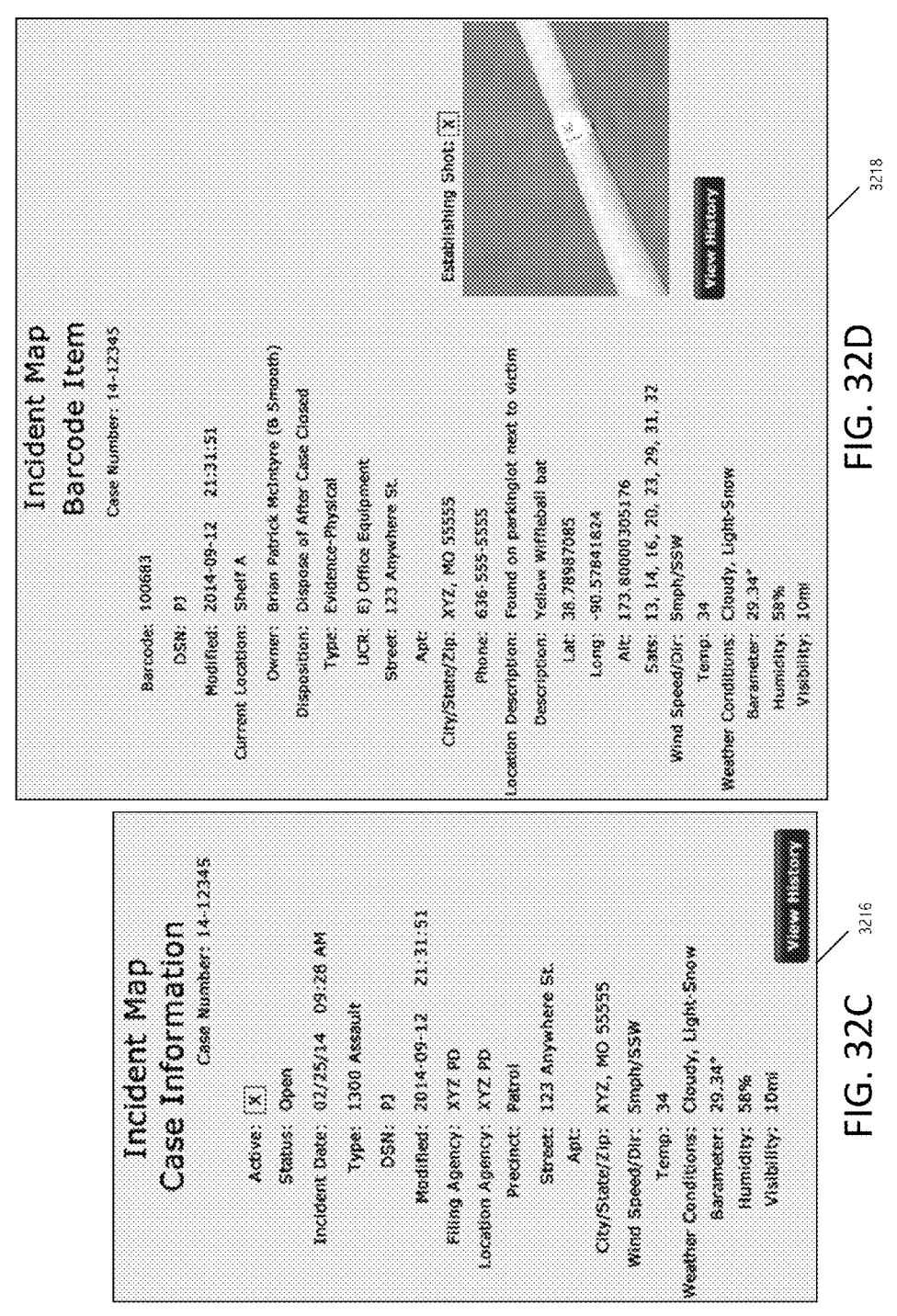

Similar to the incident text box, the case number and evidence identifier can be linked to additional information about the case and evidence, respectively. Examples of the additional case information (3216) and the additional evidence information (3218) are respectively shown in FIG. 32C and FIG. 32D. By clicking the Show History button in either of these screens, the system can provide the user with the case history and/or the evidence item history. As explained in detail above, changes to either the case or item will be recorded by the system.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. A system for collecting and tracking evidentiary materials identified during an investigation of a case, the system comprising:

a plurality of evidence containers for collecting a first set of the evidentiary materials;

a plurality of evidence tags comprising machine readable indicia, wherein a first set of evidence tags are attached to evidence containers holding the first set of the evidentiary materials;

a transportation container for holding the first set of the evidentiary materials in the evidence containers;

a transportation container identification label attached to the transportation container, wherein the transportation container identification label is comprised of a unique machine readable indicia;

a central server, wherein a case identifier for the case is stored in the central server, wherein the unique machine readable indicia is associated with the case identifier in the central server, wherein a plurality of evidence entries are stored in the central server and are correlated to the case identifier in the central server, wherein the evidence entries comprise a plurality of alphanumeric codes and a plurality of descriptions, wherein the plurality of alphanumeric codes correspond with the machine readable indicia on the plurality of evidence tags, and wherein the plurality of descriptions correspond with the evidentiary materials and are respectively correlated with the alphanumeric codes in the central server; and a handheld communication device in networked communication with the central server, wherein the handheld communication device comprises a computer processor, a memory, a display screen, and an input device, wherein a set of the evidence entries are entered into the computer processor through the input device and stored in the memory, wherein a search term is entered through the input device, wherein the computer processor performs an internal search of the memory for the search term and provides an internal search result on the display screen, wherein the handheld communication device sends the search term to the central server in an external search request, and wherein the handheld communication device receives an external search result from the central server for the search term.

2. The system of claim 1, wherein at least one of the transportation container identification label and the plurality of evidence tags further comprise a human readable indicia corresponding with the machine readable indicia, wherein the transportation container identification label further comprises a listing of at least one of the machine readable indicia and the human readable indicia on the evidence tags attached to the evidentiary materials in the transportation container.

3. The system of claim 1, wherein the central server comprises an alert system associated with the evidentiary materials, wherein the alert system comprises a plurality of notification options comprised of a future trigger date and at least one action corresponding with the future trigger date.

4. The system of claim 1, wherein a second set of evidence tags are attached to a second set of the evidentiary materials, and wherein the transportation container holds the second set of the evidentiary materials with the second set of evidence tags.

5. The system of claim 4, wherein the evidence containers and the second set of the evidentiary materials are removable from the transportation container without destruction of the transportation container and without removal of the first set of evidence tags and the second set of evidence tags from the evidence containers and the second set of the evidentiary materials, respectively.

6. The system of claim 1, wherein the handheld communication device further comprises a camera module, wherein the camera module takes a set of photographs of the evidentiary materials and scans the machine readable indicia associated with the evidentiary materials, and wherein the display screen further comprises a selection option for an establishing shot picture from the set of photographs, and wherein the computer processor assigns a reference position corresponding with the establishing shot relative to at least one of the evidence entries.

7. The system of claim 1, further comprising a printer in communication with at least one of the central server and the handheld communication device.

8. The system of claim 7, wherein the printer produces the transportation container identification label with the case identifier and at least one of the alphanumeric codes and the machine readable indicia associated with the evidentiary materials in the central server.

9. The system of claim 1, further comprising a remote computer in networked communication with the central server, wherein a name of a victim entered into the central server through the remote computer and is associated with the case identifier in the central server, and wherein the remote computer is at least one of a handheld communication device, a portable computer, and an investigatory computer tool.

10. A system for collecting and tracking evidentiary materials identified during an investigation of a case, the system comprising:
an evidentiary kit, wherein the evidentiary kit is comprised of a plurality of evidence containers, a plurality of evidence tags, and a transportation container, wherein a first set of the evidentiary materials are collected in the evidence containers, wherein the evidence tags comprise a machine readable indicia and are attached to the evidence containers, and wherein the transportation container holds the evidence containers with the first set of the evidentiary materials;
a transportation container identification label attached to the transportation container, wherein the transportation container identification label is comprised of a unique machine readable indicia and a listing of the machine readable indicia and a corresponding human readable indicia particularly identifying the evidence tags attached to the first set of the evidentiary materials in the transportation container;
a central server, wherein a case identifier for the case is stored in the central server, wherein the unique machine readable indicia is associated with the case identifier in the central server, wherein a plurality of evidence entries are stored in the central server and are correlated to the case identifier in the central server, wherein the evidence entries comprise a plurality of alphanumeric codes and a plurality of descriptions, wherein the plurality of alphanumeric codes correspond with the machine readable indicia on the plurality of evidence tags, and wherein the plurality of descriptions correspond with the first set of the evidentiary materials and are respectively correlated with the alphanumeric codes in the central server; and
a handheld communication device in networked communication with the central server, wherein the handheld communication device comprises a computer processor, a memory, a display screen, and an input device, wherein a set of the evidence entries are entered into the computer processor through the input device and stored in the memory, wherein a search term is entered through the input device, wherein the computer processor performs an internal search of the memory for the search term and provides an internal search result on the display screen, wherein the handheld communication device sends the search term to the central server in an external search request, and wherein the handheld communication device receives an external search result from the central server for the search term.

11. The system of claim 10, wherein the plurality of evidence tags further comprise the human readable indicia corresponding with the respective machine readable indicia.

12. The system of claim 10, wherein the central server comprises an alert system associated with the evidentiary materials, wherein the alert system comprises a plurality of notification options comprised of a future trigger date and at least one action corresponding with the future trigger date.

13. The system of claim 10, wherein a second set of evidence tags are attached to a second set of the evidentiary materials, and wherein the transportation container holds the second set of the evidentiary materials with the second set of evidence tags.

14. The system of claim 13, wherein the evidence containers and the second set of the evidentiary materials are removable from the transportation container without destruction of the transportation container and without removal of the first set of evidence tags and the second set of evidence tags from the evidence containers and the second set of the evidentiary materials, respectively.

15. A method for collecting and tracking evidentiary materials identified during an investigation of a case, the method comprising the steps of:

providing an evidentiary kit, wherein the evidentiary kit is comprised of a plurality of evidence containers, a plurality of evidence tags, and a transportation container, wherein the evidence tags comprise a machine readable indicia and a human readable indicia;

collecting a first set of the evidentiary materials in the evidence containers;

attaching a first set of the evidence tags to the evidence containers;

holding the evidence containers in the transportation container with the first set of the evidentiary materials;

attaching a transportation container identification label to the transportation container, wherein the transportation container identification label is comprised of a unique machine readable indicia;

storing a case identifier for the case in a central server;

associating the unique machine readable indicia with the case identifier in the central server;

entering a plurality of evidence entries in the central server, wherein the evidence entries comprise a plurality of alphanumeric codes and a plurality of descriptions, wherein the plurality of alphanumeric codes correspond with the machine readable indicia on the plurality of evidence tags, and wherein the plurality of descriptions correspond with the evidentiary materials;

correlating the evidence entries to the case identifier in the central server;

correlating the plurality of descriptions with the alphanumeric codes in the central server performing an internal search of the evidence entries for a search term in a local memory of a networked computer in remote communication with the central server;

obtaining an internal search result from the local memory of the networked computer;

sending an external search request from the networked computer to the central server with the search term for the evidence entries; and receiving an external search result from the central server for the search term.

16. The method of claim 15, further comprising the steps of:

attaching a second set of evidence tags to a second set of the evidentiary materials;

holding the second set of the evidentiary materials in the transportation container; and removing the evidence containers and the second set of the evidentiary materials from the transportation container without destruction of the transportation container and without removal of the first set of evidence tags and the second set of evidence tags from the evidence containers and the second set of the evidentiary materials, respectively.

17. The method of claim 15, further comprising the steps of:

providing a plurality of evidentiary kits for a plurality of cases involving a plurality of corresponding victims, wherein the evidence kits have a plurality of respective transportation container identification labels and corresponding evidence containers, evidence tags, and transportation containers;

providing the human readable indicia for the evidence tags on the respective transportation container identification labels;

entering a plurality of victim names to the central server, wherein the victim names are associated with individual ones of the evidentiary kits according to the transportation container identification labels; and associating the victim names with a plurality of respective case identifiers in the central server.

\* \* \* \* \*